(12) United States Patent
Osaka et al.

(10) Patent No.: US 9,573,437 B2
(45) Date of Patent: Feb. 21, 2017

(54) VEHICULAR AIR CONDITIONING SYSTEM

(75) Inventors: Tadashi Osaka, Kashiwa (JP); Hiroaki Matsushima, Souraku-gun (JP); Sachio Sekiya, Hitachinaka (JP); Riichi Uchida, Kasama (JP); Yuki Akiyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 13/982,869

(22) PCT Filed: Feb. 21, 2011

(86) PCT No.: PCT/JP2011/053660
§ 371 (c)(1),
(2), (4) Date: Jul. 31, 2013

(87) PCT Pub. No.: WO2012/114422
PCT Pub. Date: Aug. 30, 2012

(65) Prior Publication Data
US 2013/0299129 A1   Nov. 14, 2013

(51) Int. Cl.
*B60H 1/02* (2006.01)
*B60H 1/00* (2006.01)

(52) U.S. Cl.
CPC ........ *B60H 1/00021* (2013.01); *B60H 1/0005* (2013.01); *B60H 1/00907* (2013.01);
(Continued)

(58) Field of Classification Search
CPC ................ B60H 1/12; B60H 1/143; B60H 2001/00278; B60H 1/0021; B60H 1/0005; B60H 1/00907; B60H 2001/00178; B60H 2001/00928
See application file for complete search history.

(56) References Cited

U.S. PATENT DOCUMENTS 5,725,048 A * 3/1998 Burk .................. B60H 1/034
165/236
5,971,290 A * 10/1999 Echigoya ........... B60H 1/00485
237/12.3 A
(Continued)

FOREIGN PATENT DOCUMENTS

DE   102009042774 A1 * 3/2011 ......... B60H 1/00278
DE   102010042122 A1 * 4/2012 ......... B60H 1/00278
(Continued)

*Primary Examiner* — Devon Russell
(74) *Attorney, Agent, or Firm* — Volpe and Koenig, P.C.

(57) ABSTRACT

A vehicular air conditioning system for saving energy includes: a first indoor cooling heat exchanger for suctioning in and cooling the air within or outside a vehicle; an indoor air conditioning heat exchanger installed on the downstream cooling heat exchanger for regulating the temperature of the applicable air, a refrigeration cycle connected to the applicable indoor air conditioning heat exchanger, a heating element mounted in the vehicle, and a circuit for the machine coolant circulating between the applicable heating element and the applicable first indoor cooling heat exchanger, and in which the air flow path for air flowing into the indoor air conditioning heat exchanger is structured by merging a flow path passing through the first indoor cooling heat exchanger to a flow path not passing through the first indoor cooling heat exchanger, and is also configured to allow switching to either of the two flow paths.

3 Claims, 28 Drawing Sheets

(52) U.S. Cl.
CPC .............. *B60H 2001/00178* (2013.01); *B60H 2001/00928* (2013.01)

(56) References Cited

U.S. PATENT DOCUMENTS

| | | | | |
|---|---|---|---|---|
| 6,574,977 | B2* | 6/2003 | Ozaki | B60H 1/00792 62/210 |
| 6,823,683 | B2* | 11/2004 | Amaral | B60H 1/00907 62/159 |
| 6,901,765 | B2* | 6/2005 | Amaral | B60H 1/00907 62/239 |
| 6,913,067 | B2* | 7/2005 | Hesse | B60H 1/08 165/202 |
| 7,152,422 | B2* | 12/2006 | Takano | B60H 1/00878 62/238.6 |
| 7,451,808 | B2* | 11/2008 | Busse | B60H 1/00278 165/202 |
| 8,448,460 | B2* | 5/2013 | Dogariu | B60H 1/00278 62/178 |
| 8,909,398 | B2* | 12/2014 | Sawada | B60K 11/02 165/200 |
| 9,365,090 | B2* | 6/2016 | Gawthrop | B60H 1/004 |
| 2003/0010488 | A1* | 1/2003 | Watanabe | B60H 1/00335 165/202 |
| 2004/0000161 | A1* | 1/2004 | Khelifa | B60H 1/00392 62/324.1 |
| 2004/0060316 | A1* | 4/2004 | Ito | B60H 1/00328 62/324.1 |
| 2004/0200610 | A1* | 10/2004 | Hara | B60H 1/00314 165/202 |
| 2005/0067158 | A1* | 3/2005 | Ito | B60H 1/00007 165/204 |
| 2005/0241818 | A1* | 11/2005 | Yakumaru | B60H 1/004 165/202 |
| 2006/0053814 | A1* | 3/2006 | Naik | B60H 1/3208 62/241 |
| 2009/0020620 | A1* | 1/2009 | Douarre | B60H 1/00278 237/12.3 R |
| 2010/0000713 | A1* | 1/2010 | Takahashi | B60H 1/00899 165/61 |
| 2011/0072841 | A1* | 3/2011 | Arai | B60H 1/00278 62/259.2 |
| 2012/0222441 | A1* | 9/2012 | Sawada | B60H 1/00392 62/238.1 |
| 2012/0222446 | A1* | 9/2012 | Sekiya | B60H 1/00385 62/498 |

FOREIGN PATENT DOCUMENTS

| | | | | |
|---|---|---|---|---|
| DE | 102010042127 | A1 * | 4/2012 | ......... B60H 1/00278 |
| DE | 102012103099 | A1 * | 10/2013 | ......... B60H 1/00492 |
| JP | 60-015217 | A | 1/1985 | |
| JP | 61-092910 | A | 5/1986 | |
| JP | 08-258548 | A | 10/1996 | |
| JP | 11-286211 | A * | 10/1999 | ............... B60H 1/32 |
| JP | 2007-278624 | A | 10/2007 | |
| JP | 2008-230594 | A | 10/2008 | |
| JP | 4285292 | A | 4/2009 | |
| JP | 2011-073536 | A | 4/2011 | |
| JP | 2011-093424 | A | 5/2011 | |
| JP | 2011-105150 | A | 6/2011 | |
| JP | 2011-105151 | A | 6/2011 | |
| JP | 2011-111139 | A | 6/2011 | |
| JP | 2011-111140 | A | 6/2011 | |
| JP | 2011-112312 | A | 6/2011 | |
| JP | WO 2011065074 | A1 * | 6/2011 | ............. B60L 1/003 |
| JP | 2011-166866 | A | 8/2011 | |
| JP | 2012-030699 | A | 2/2012 | |
| JP | 2012-035812 | A | 2/2012 | |
| JP | 2012-051386 | A | 3/2012 | |

* cited by examiner

MACHINE COOLING OPERATION

COOLING AIR CONDITIONING OPERATION

COOLING AIR CONDITIONING AND MACHINE COOLING OPERATION

HEATING AIR CONDITIONING OPERATION

HEATING AIR CONDITIONING AND MACHINE COOLING OPERATION

DEHUMIDIFYING OPERATION

HEATING AIR CONDITIONING AND DEHUMIDIFYING OPERATION

MACHINE HEATING OPERATION

DEFROST OPERATION

OUTER AIR FEED, AND INTAKE AIR TO INSIDE VEHICLE

INNER AIR CIRCULATION, AND INTAKE AIR TO INSIDE VEHICLE

OUTER AIR FEED, AND INTAKE AIR TO OUTSIDE VEHICLE

OUTER AIR FEED, AND INTAKE AIR TO INSIDE VEHICLE AND OUTSIDE VEHICLE

FIG.18

| VEHICLE INTERIOR | MOTOR | INVERTER | BATTERY | GEARBOX |
|---|---|---|---|---|
| ·DOES COOLING AND HEATING AIR CONDITIONING (AC) AND DEHUMIDIFYING. ·INCLUDES STOPPING OR WEAKENING THE COOLING A/C IN ORDER TO COOL THE HEAT EMITTING ELEMENTS | ·COOLING ONLY ·EXTENDS THE HIGH TORQUE OUTPUT TIME BY COOLING ·MACHINE COOLANT TEMPERATURE OF 60°C OR LESS | ·COOLING ONLY ·EXTENDS THE HIGH TORQUE OUTPUT TIME BY COOLING ·MACHINE COOLANT TEMPERATURE OF 60°C OR LESS | ·WARM-UP/COOLING ·BOOST THE CHARGE /DISCHARGE EFFICIENCY BY SETTING A SPECIFIC TEMPERATURE RANGE | ·ENGINE STARTING WARM-UP (ESPECIALLY IN WINTER) ·NO COOLING FROM AC SYSTEM. REMOVE WASTE HEAT. ·LARGE GEAR AGITATION LOSS IF LUBRICANT OIL TEMPERATURE IS LOW ·OIL FILM CAN'T FORM ON GEAR MESH SURFACES AND LARGE FRICTION LOSS WHEN LUBRICANT TEMPERATURE IS HIGH |

FIG. 21

| | | COMPONENT | | | | |
|---|---|---|---|---|---|---|
| | | INSIDE VEHICLE | MOTOR | INVERTER | BATTERY | GEARBOX |
| VEHICLE STATUS | DURING CHARGING | × | × | × | → WARM-UP/COOLING SO AS TO REACH SPECIFIED TEMPERATURE RANGE | × |
| | BEFORE STARTING DRIVING | → COOLING/HEATING AIR CONDITIONING WITH AC POWER SUPPLY | × | × | → WARM-UP/COOLING SO AS TO REACH SPECIFIED TEMPERATURE RANGE | → WARM-UP WHEN OIL TEMPERATURE IS LOW |
| | BEFORE VEHICLE STARTS MOVING | → | → | → | → WARM-UP/COOLING SO AS TO REACH SPECIFIED TEMPERATURE RANGE | → WARM-UP WHEN OIL TEMPERATURE IS LOW |
| | ACCELERATION/ DECELERATION, AND MOUNTAIN ROAD, BEFORE DRIVING AND DURING DRIVING | → OR WEAKER DURING COOLING AC AND STRONGER FOR HEATING AC | ↓ | ↓ | → WARM-UP/COOLING SO AS TO REACH SPECIFIED TEMPERATURE RANGE | → RECOVER WASTE HEAT |
| | DURING DRIVING ON ORDINARY ROADS | → | → | → | → | → |
| | DURING DRIVING AND BEFORE DRIVING ON HIGH-SPEED ROADS | → OR WEAKER DURING COOLING AC AND STRONGER FOR HEATING AC | ↓ | ↓ | → WARM-UP/COOLING SO AS TO REACH SPECIFIED TEMPERATURE RANGE | → RECOVER WASTE HEAT |
| | BEFORE TEMPORARY STOPS (WAITING FOR SIGNAL TO CHANGE, TRAFFIC JAMS) | → | ↑ | ↑ | ↑↓ | → RECOVER WASTE HEAT |
| | BEFORE VEHICLE STOPS | × OR WEAKEN | ↑ | ↑ | ↑↓ | × |
| | WHEN VEHICLE IS STOPPED | × | × | × | × | × |

× : NO COOLING/HEATING AC AND COOLING/WARM-UP
↑ : RAISE THE TEMPERATURE SETTING
↓ : LOWER THE TEMPERATURE SETTING
→ : DO NOT CHANGE THE TEMPERATURE SETTING
↑↓ : WIDEN THE TEMPERATURE SETTING RANGE

NOTE: RETURN THE CHANGED TEMPERATURE SETTING TO ORIGINAL SETTING WHEN VEHICLE STATUS HAS CHANGED

MACHINE COOLING OPERATION

COOLING AIR CONDITIONING OPERATION

COOLING AIR CONDITIONING AND MACHINE COOLING OPERATION

HEATING AIR CONDITIONING OPERATION

HEATING AIR CONDITIONING AND MACHINE COOLING OPERATION

DEHUMIDIFYING OPERATION

MACHINE HEATING OPERATION

DEFROST OPERATION

VEHICULAR AIR CONDITIONING SYSTEM

TECHNICAL FIELD

The present invention relates to a vehicular air conditioning system ideal for electrically driven vehicles such as electric cars, hybrid cars, and electric railway cars.

BACKGROUND ART

A vehicular air conditioning system for hybrid cars as disclosed for example in patent document 1 is a vehicular coolant system comprised of a coolant circuit including a circulating pump to circulate coolant for cooling the vehicle onboard heating element by coolant circulated by this circulating pump, and a refrigerating cycle device including a compressor to compress the coolant, a coolant refrigerator to cool the coolant from this compressor, a pressure reducer to decrease the pressure of the coolant from this coolant refrigerator, an evaporator to absorb the heat from the coolant within the coolant circuit and evaporate the coolant from the pressure reducer; and in which the coolant circuit contains an in-vehicle air conditioning heat exchanger to exchange the heat between the coolant and the air blown inside the vehicle.

A vehicular air conditioning system combining a heat pump type cooler and a heating circulator for heating as disclosed for example in patent document 2, is a system that cools and heats by utilizing a heat pump type cooler; and in which the system includes a heat pump type cooler A including a first circulating path, and heating circulator B including a second circulating path in order to simplify the structure of the heat pump type cooler; and the water-cooled condenser within the first circulating path discharges heat from the first coolant placed within the second circulating path 8 to the second coolant, and a flow path selector valve to switch the flow path between the heat radiator side and the heat radiator bypass flow path is installed; and during heating air conditioning operation the flow path selector valve flows the second coolant to the heat radiator bypass flow path to supply air heated by the heater core to inside the vehicle as an air conditioning breeze; and during cooling air conditioning operation the flow path selector valve flows the second coolant to the heat radiator, to supply air cooled by the evaporator to inside the vehicle as an air conditioning breeze.

CITATION LIST

Patent Literature

Patent literature 1: Japanese Patent No. 4285292
Patent literature 2: Japanese Unexamined Patent Application Publication No. 2008-230594

SUMMARY OF INVENTION

Technical Problem

Energy-saving effect in vehicular air conditioning systems for hybrid cars in the related art is inadequate and further improvements are needed

Solution to Problem (1) A first aspect of the present invention for a vehicular air conditioning system includes: a machine coolant circuit for the heat-generating devices mounted in the vehicle, an in-vehicle air conditioning device containing a refrigerating cycle circuit, a machine coolant which circulates through the machine coolant circuit, and an intermediate heat exchanger to exchange heat in the air conditioning coolant of the refrigerating cycle circuit; and to suction in air outside the vehicle or air within the vehicle, regulate the temperature of the applicable air and blow that air inside the vehicle; and further including a first indoor cooling heat exchanger for cooling the applicable air, an indoor air conditioning heat exchanger installed on the downstream side of air that passed through the applicable first indoor cooling heat exchanger for regulating the temperature of that applicable air, a refrigeration cycle connected to the applicable indoor air conditioning heat exchanger, a heating element mounted in the vehicle, and a machine coolant circuit for circulating between the applicable heating element and the applicable first indoor cooling heat exchanger, and in which the air flow path for air flowing into the indoor air conditioning heat exchanger, merges a flow path passing through the first inside cooling heat exchanger, to a flow path not passing through the first inside cooling heat exchanger, and is structured to allow switching to either of the applicable two flow paths.

(2) A second aspect of the present invention for a cooling system for electrically-driven vehicles according to the first aspect in which one indoor unit includes the first indoor cooling heat exchanger, the indoor air conditioning heat exchanger, the flow path, and the flow path after merging of the flow paths.

(3) A third aspect of the present invention for a machine coolant circuit of the vehicular air conditioning system according to the first aspect, in which a branch circuit contains a first indoor cooling heat exchanger and a second indoor cooling heat exchanger arrayed in parallel, and the applicable second indoor cooling heat exchanger is installed on the downstream side of the indoor air conditioning heat exchanger in the air flow path (4) A fourth aspect of the present invention for the vehicular air conditioning system according to the third aspect in which the indoor cooling heat exchanger is mounted outside.

(5) A fifth aspect of the present invention for the vehicular air conditioning system according to the first aspect, including an intermediate heat exchanger to exchange heat between the machine coolant and the air conditioning coolant.

(6) A sixth aspect of the present invention for the vehicular air conditioning system according to the first aspect in which the flow path can be switched to release the air that passed through the first indoor cooling heat exchanger to outside the vehicle.

(7) A seventh aspect of the present invention for the vehicular air conditioning system according to the first aspect in which an electric heater is installed in the downstream air path of air passing through the indoor air conditioning heat exchanger.

(8) An eighth aspect of the present invention for an operating method of a vehicular air conditioning system that selects and switches to plurality of operating modes in a vehicular air conditioning system that along with cooling the heat-generating device installed in the vehicle also suctions in air outside the vehicle or inside the vehicle, adjusts the temperature of the applicable air, and blows the air inside the vehicle; also includes a first step for cooling the heating element mounted in the vehicle by using the machine coolant; and a second step for cooling the machine coolant by the suctioned air; and a third step to allow switching to merge the air that passed through the second step and the air that did not pass through the second step, and a fourth step to adjust the temperature of the applicable air by performing heat exchange between the air that passed through the third step and the air conditioning coolant.

(9) A ninth aspect of the present invention for an operating method for a vehicular air conditioning system in which when the selected mode is cooling air conditioning operation, in the third step the flow path is switched so that the air whose temperature was raised in the second step is released outside the vehicle, and only air that did not pass through the second step is supplied.

(10) A tenth aspect of the present invention for an operating method for a vehicular air conditioning system further including a fifth step to heat the air that passed through the fourth step by using an electric heater.

(11) An eleventh aspect of the present invention for an operating method for a vehicular air conditioning system in which, when the selected mode is dehumidifying operation, the air is cooled in the fourth step, and heated in the fifth step.

(12) A twelfth aspect of the present invention for an operating method for a vehicular air conditioning system in which, when the selected mode is heating air conditioning operation, the air is heated in the fourth step, and is further heated in the fifth step as needed.

Advantageous Effects of Invention

The present invention is capable of providing a vehicular air conditioning system capable of suppressing electrical power consumption in the refrigerating cycle.

BRIEF DESCRIPTION OF DRAWINGS

FIG. 18 is a list showing the targets for temperature regulation, and their conditions;

FIG. 21 is a table showing the vehicle status and changes in the temperatures set for the heating element 9 as the device requiring temperature regulation;

DESCRIPTION OF EMBODIMENTS

One embodiment of the vehicular air conditioning system of the present invention applied to electric cars is described next however the range of the present invention is not limited to this embodiment. The present invention is not limited to electric cars and may be applied to hybrid cars or electric railway cars, construction motor vehicles, and other electrically driven vehicles such as other custom vehicles. Moreover, in this first embodiment an alternating current (AC) motor driven by an inverter was described as an example, however the present invention is not limited to an AC motor and for example may be applied to all types of rotary electrical machines (motors and generators) such as direct current motors driven by a converter such as thyristor leonard device, or a pulse motor driven by a chopper power supply, etc.

(1) Vehicle Air conditioning System Structure

Figure 1:
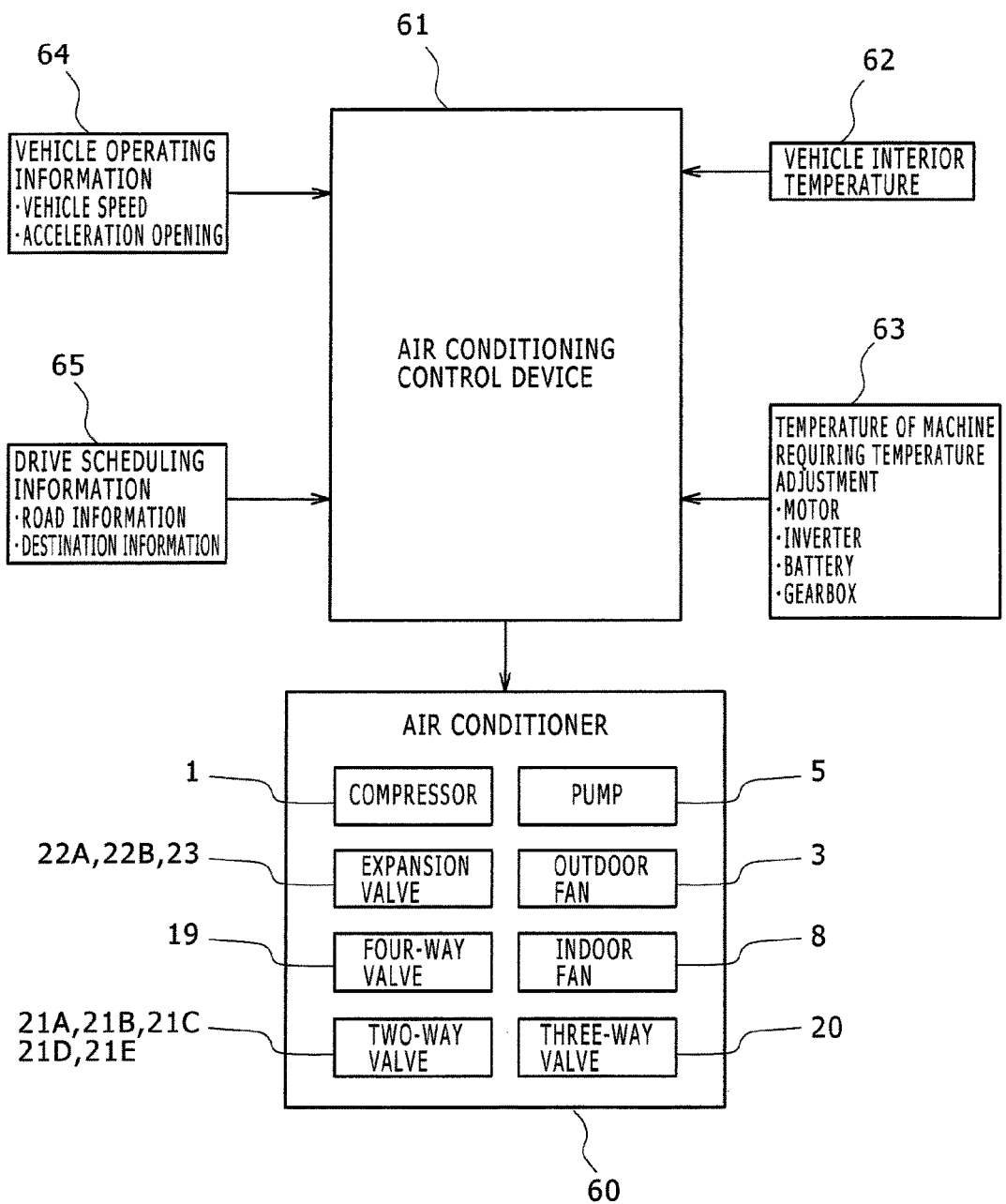
FIG. 1 is a drawing showing the overall structure of the vehicular air conditioning system of the present invention.

FIG. 1 is a drawing showing the overall structure of the vehicular air conditioning system of the present invention. The vehicular air conditioning system shown in FIG. 1 is comprised of an air conditioner 60 for performing cooling/heating air conditioning and cooling/heating of the vehicle interior and machine requiring temperature regulation; and an air conditioning control device 61 to control the air conditioner 60. Control signals from the air conditioning control device 61 control the different types of actuators mounted in the air conditioner 60. The actuator for the present embodiment contains a compressor 1, expansion valves 22A, 22B, 23 as a flow rate control method, a four-way valve 19 as a first flow path selector method, three-way valves 20 as a second flow path selector method, the two-way valves 21A, 21B, 21C, 21D, 21E, pump 5, outdoor fan 3, and indoor fan 8.

A temperature sensor inputs the vehicle indoor temperature 62, and the temperature 63 for the machine requiring temperature regulation to the air conditioner control device 61. The present embodiment contains machines such as motors, inverters, battery, and gear boxes as equipment requiring temperature adjustment, and a temperature sensor is mounted in each of these machines. Besides the acceleration sensor and vehicle speed sensor inputting the degree of acceleration opening and the vehicle speed as the vehicle operating information 64 into the air conditioner control device 61, a navigation device inputs road information or target destination information as the drive schedule information 65 of the vehicle.

(2) Air Conditioner Structure

Figure 2:
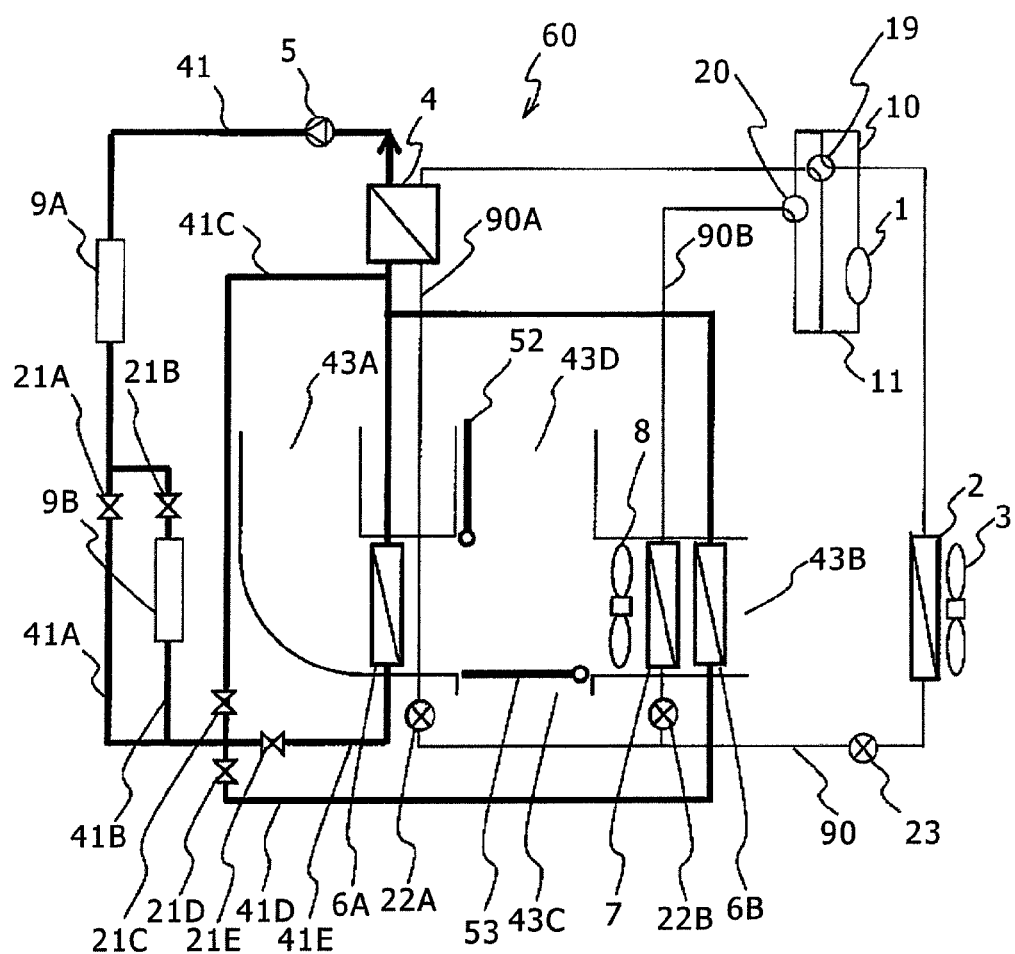
FIG. 2 is a drawing showing the overall structure of an air conditioner 60 of the first embodiment of the present invention.

FIG. 2 is a drawing showing the overall structure of an air conditioner 60. The air conditioner 60 contains a refrigeration cycle circuit 90 for circulating the air conditioning coolant (e.g. refrigerant) to cool the heating element 9 and for indoor air conditioning; and a machine coolant circuit 41 to circulate the machine coolant (e.g. cooling water) for cooling the heating element 9.

A compressor 1 to compress the coolant, an outdoor heat exchanger 2 to carry out heat exchange between the air conditioning coolant and the outside air, an intermediate heat exchanger 4 within the refrigerating cycle circuit 90A that was branched to carry out heat exchange between the air conditioning coolant and the machine coolant flowing within the machine coolant circuit 41, and an indoor air conditioning heat exchanger 7 within the refrigerating cycle circuit 90B to carry out heat exchange between the air conditioning coolant and the vehicle interior air are connected to the refrigerating cycle circuit 90 by way of a fluid pipe for circulating the air conditioning coolant.

A four-way valve 19 is installed between the intake pipe 11 and the dispensing pipe 10 of the compressor 1. Switching the four-way valve 19 allows connecting either of the intake pipe 11 and dispensing pipe 10 to the outdoor heat exchanger 2, and connecting the other to the intermediate heat exchanger 4 and the indoor air conditioning heat exchanger 7. The four-way valve 19 shown in FIG. 2, connects the dispensing pipe 10 to the outdoor heat exchanger 2, and connects the intake pipe 11 to the intermediate heat exchanger 4.

One end of the indoor air conditioning heat exchanger 7 is connected to the outdoor heat exchanger 2, and the other end is connected by way of the three-way valve to allow switching to either of the dispensing pipe 10 or the intake pipe 11 of the compressor 1. The expansion valves 23, 22A, 22B functioning as the flow rate control method for the air conditioning coolant are respectively mounted on the side not connected to the compressor 1 of the outdoor heat exchanger 2, between the intermediate heat exchanger 4 and the outdoor heat exchanger 2, and between the indoor air conditioning heat exchanger 7 and the outdoor heat exchanger 2. The outdoor heat exchanger 2 contains an outside fan 3 for blowing outside air.

The machine coolant circuit 41 is connected in sequence in a ring-shaped layout to an indoor cooling heat exchanger 6 in which that the machine coolant internally flows to perform heat exchange with vehicle interior air flow, the intermediate heat exchanger 4, the pump 5 to circulate the machine coolant within the machine coolant circuit 41, and the heating element 9 as the machine requiring temperature adjustment.

The indoor cooling heat exchanger 6 in the machine coolant circuit 41 is an indoor cooling heat exchanger 6A as a first indoor cooling heat exchanger, and an indoor cooling heat exchanger 6B as a second indoor cooling heat exchanger, the two of which are installed in parallel. A bypass circuit 41C functioning as a bypass is mounted on both ends of these two indoor cooling heat exchanger 6A and 6B. A two-way valve 21C is mounted along the bypass circuit 41C, a two-way valve 21E is mounted on the circuit 41E passing through the indoor cooling heat exchanger 6A, and a two-way valve 21D is mounted on the circuit 41D passing through the indoor cooling heat exchanger 6B. The opening and closing action of these two-way valves 21C, 21D, 21E allows switching the flow paths for the machine coolant. These two-way valves connect to the machine coolant circuit 41 to allow regulating the temperature of the plural heating elements 9A, 9B as shown in FIG. 2. A two-way valve 21B is installed in the machine coolant circuit 41B containing the heating element 9B, and a two-way valve 21A is installed in the machine coolant circuit 41A not passing through the heating element 9B. The temperature of both the heating elements 9A, 9B can in this way be regulated when the two-way valve 21A is closed and the two-way valve 21B is opened, however only the temperature of the heating element 9A can be regulated when the two-way valve 21A is opened and the two-way valve 2B is closed. A plurality of heating elements 9 may even be connected in series at the position of the heating element 9A. The method for connecting the heating elements 9, and the method for installing the two-way valves can be changed according to the heating element temperature conditions.

To provide indoor air conditioning, the indoor unit blowing the temperature-regulated air contains an indoor fan to suction indoor (in-vehicle) or outdoor (outside the vehicle) air, and blow to inside the vehicle or outside the vehicle, an indoor cooling heat exchanger 6A, 6B, the indoor air conditioning heat exchanger 7, and the switching dampers 52, 53 to perform switching so as to blow the air that was heat-exchanged in the indoor cooling heat exchanger 6 to inside the vehicle or outside the vehicle, and the air in/out ports 43A, 43B, 43C, 43D to suction the vehicle inside or vehicle outside air, or blow air to inside the vehicle or outside the vehicle.

The indoor cooling heat exchanger 6A, 6B are respectively installed on the upstream side or downstream side of the indoor air conditioning heat exchanger 7, and the switching dampers 52, 53 are installed between the indoor air conditioning heat exchanger 7 and the indoor cooling heat exchanger 6A. The indoor unit suctions air from the air intake ports 43A, 43D by way of the indoor fan 8, and blows air from the air dispensing ports 43B, 43C.

The air intake ports 43A, 43D suction in air inside the vehicle (inside air) or air outside the vehicle (outside air) by way of ducts not shown in the drawing. The air dispensing port 43B blows air to inside the vehicle (inside vehicle) from a duct not shown in the drawing, and the air dispensing port 43C blows air to outside the vehicle (outside air) from a duct not shown in the drawing.

The switching damper 52 is capable of adjusting the air flow suctioned in from the air intake port 43D and can variably control the degree of opening. The air suctioned in from the air intake port 43D passes through the indoor air conditioning heat exchanger 7 and the indoor cooling heat exchanger 6B without passing through the indoor cooling heat exchanger 6A, and is blown into the interior of the vehicle from the air dispensing port 43B.

After the air suctioned in from the air intake port 43A has passed through the indoor cooling heat exchanger 6A, the switching damper 53 blow the air from the air dispensing port 43C to outside the vehicle or blows the air to inside the vehicle from the air dispensing port 43B.

The operation of the air conditioner 60 as shown in FIG. 2 is described next. In the present embodiment, the temperature of the heating element 9 is adjusted by circulating the machine coolant by the pump 5. The operation of the other machines varies according to the amount of heat emitted from the air conditioning load and the heating element 9. The machine cooling, cooling air conditioning, cooling air conditioning+machine cooling, heating air conditioning, heating air conditioning+machine cooling, dehumidifying, heating air conditioning+dehumidifying, machine heating, and defrosting operation is described next.

(3) Machine Cooling Operation

Figure 3:
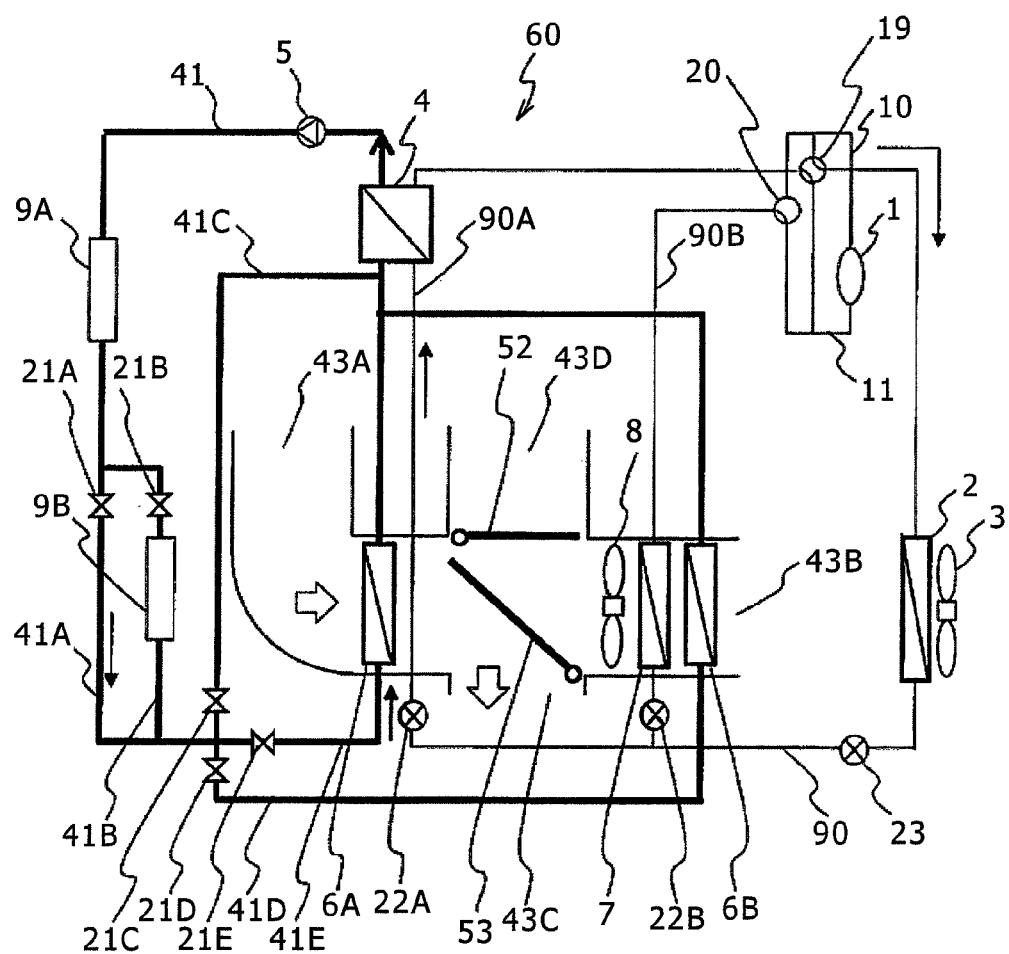
FIG. 3 is a drawing showing the overall structure of an air conditioner 60 of the first embodiment in the mode for machine cooling operation.

Machine cooling operation is an operation to cool the heating elements 9 in a state where there is no vehicle indoor air conditioning and is described while referring to FIG. 3. This operation is utilized when the indoor cooling heat exchanger 6A is only cooling the machine coolant circulating in the machine coolant circuit 41; and when the indoor cooling heat exchanger 6A and intermediate heat exchanger 4 are cooling the machine coolant.

Closing the two-way valves 21C, 21D and opening the two-way valve 21E in the machine coolant circuit 41 causes the machine coolant driven by the pump 5 to circulate in the indoor cooling heat exchanger 6A and the intermediate heat exchanger 4. Machine coolant flows in the machine coolant circuit 41A when the two-way valve 21B is closed, and when the two-way valve 21A is opened. Machine coolant flows in the machine coolant circuit 41B when the two-way valve 21A is closed and the two-way valve 21B is opened. The two-way valve 21A is closed and the two-way valve 21B is opened if cooling both the heating elements 9A, 9B.

As shown in FIG. 3, the switching dampers 52, 53 within the indoor unit 42 are set so that the air suctioned in by the air in/out port 43A passes through the indoor cooling heat exchanger 6A and is blown from the air in/out port 43C. The passage of air through the indoor cooling heat exchanger 6A cools the machine coolant. The cooling capability can moreover be adjusted by way of the air flow suctioned in by the indoor fan 8. The air in/out port 43C is rendered by way of a duct not shown in the figure so as not to blow warm air into the vehicle.

When the intermediate heat exchanger 4 is cooling the machine coolant, the four-way valve 19 and the three-way valve 20 are connected as shown in FIG. 3, and the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. The expansion valve 22B is fully closed so that no air conditioning coolant flows into the indoor air conditioning heat exchanger 7. In other words, the outdoor heat exchanger 2 serves as a condenser and the intermediate condenser 4 serves as an evaporator.

After the air conditioning coolant compressed by the compressor 1, is liquefied by heat discharge from the outdoor heat exchanger 2, the air conditioning coolant passes through the fully open expansion valve 23 and flows into the intermediate heat exchanger 4. The air conditioning coolant flowing into the intermediate heat exchanger 4 is depressurized by the expansion valve 22A and reaches a low pressure, low temperature state, and evaporates due to the absorption of heat from the machine coolant in the machine coolant circuit 41 in the intermediate heat exchanger 4, and returns by way of the four-way valve 19 to the compressor 1. Heat exchange between the machine coolant and the air conditioning coolant takes place in the intermediate heat exchange 4 by utilizing the refrigeration cycle circuit 90 to cool the machine coolant.

The machine coolant can in this way be cooled by the indoor cooling heat exchanger 6A and the intermediate heat exchanger 4. When the machine coolant is a lower temperature than the specified temperature, the machine coolant is cooled only in the indoor cooling heat exchanger 6A without utilizing the refrigeration cycle circuit 90, and when the machine coolant is a higher temperature than the specified temperature, the machine coolant is cooled in the intermediate heat exchanger 4 and the indoor cooling heat exchanger 6A utilizing the refrigeration cycle circuit 90.

The air flow of the internal fan 8, the flow rate of the pump 5, the rotation speed of the compressor 1, the degree of opening of the expansion valve 22A, and the air flow of the outdoor fan 3 may be controlled in order to regulate the temperature of the machine coolant. When the machine coolant is a higher temperature than the target temperature, the air flow of the indoor fan 8 may be increased, the flow rate of the pump 5 may be increased, the rotation speed of the compressor 1 may be increased, the degree of opening of the expansion valve 22A may be widened, and the air flow of the outdoor fan 3 may be increased. On the other hand, when the machine coolant is a lower temperature than the target temperature, the air flow of the indoor fan 8 may be decreased, the flow rate of the pump 5 may be decreased, the rotation speed of the compressor 1 may be decreased, the degree of opening of the expansion valve 22A may be narrowed, and the air flow of the outdoor fan 3 may be decreased. Not all of the actuators need be controlled, and just controlling at least one actuator is sufficient.

(4) Cooling Air Conditioning Operation

The cooling air conditioning operation is an operation that cools the interior of the vehicle without cooling the heating element 9. The cooling air conditioning operation is described while referring to FIG. 4.

The machine coolant circuit 41 causes the pump 5 to drive the machine coolant to flow in the machine coolant circuit 41C without flowing through the indoor cooling heat exchangers 6A, 6B by closing the two-way valve 21D, 21E and opening the two-way valve 21C. In this way, an uneven temperature rise in the machine coolant in the heating element 9 section is prevented by circulating the machine coolant in the machine coolant circuit 41 even if there is no cooling of the heating element 9. If the two-way valve 21A is opened and the two-way valve 21B is closed, the machine coolant flows into the machine coolant circuit 41A, and if the two-way valve 21A is closed and the two-way valve 21B is opened, the machine coolant flows into the machine coolant circuit 41B.

Figure 4:
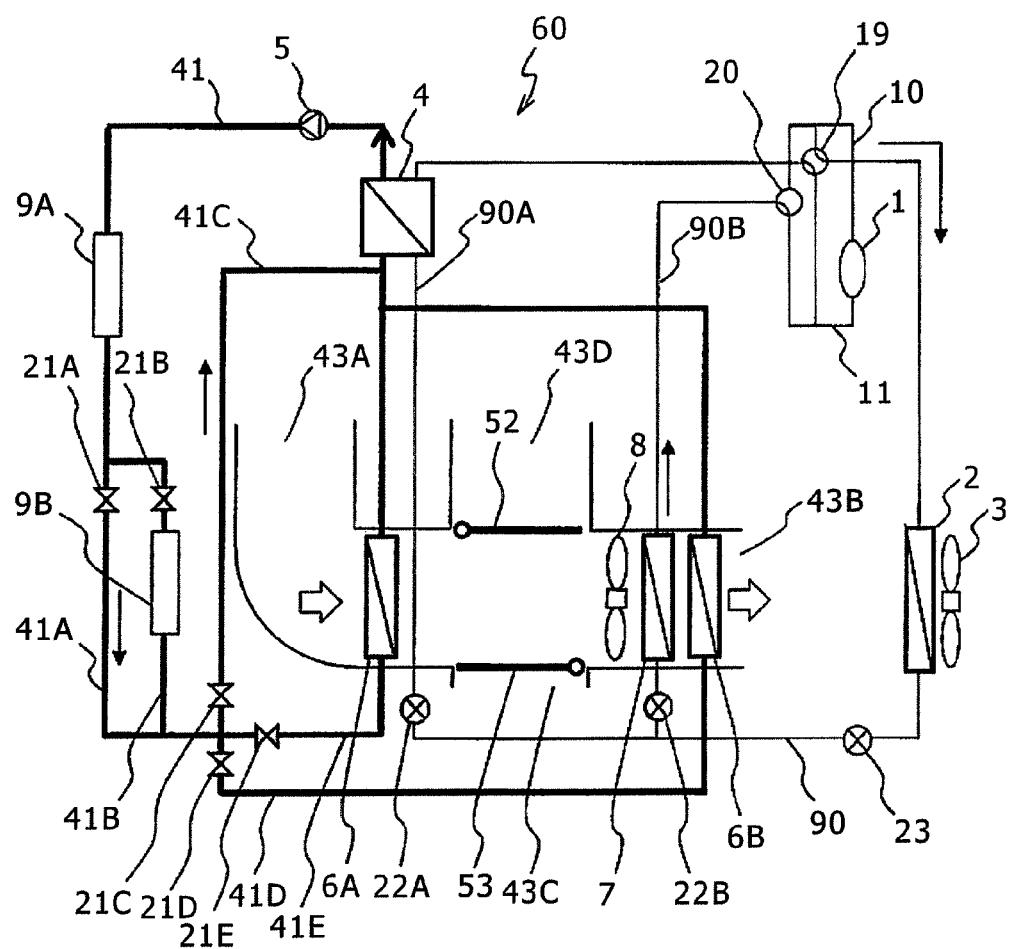
FIG. 4 is a drawing showing the overall structure of the air conditioner 60 of the first embodiment in the mode for cooling air conditioning operation.

The switching dampers 52, 53 within the indoor unit 42 are set as shown in FIG. 4, so that the air suctioned in by the air in/out port 43A passes through the indoor cooling heat exchanger 6A, the indoor air conditioning heat exchanger 7 and the indoor cooling heat exchanger 6B, and is blown out from the air in/out port 43B. No machine coolant circulates in these indoor cooling heat exchangers 6A, 6B so that there are no temperature fluctuations in the air passing through the indoor cooling heat exchangers 6A, 6B. The air in/out port 43B is connected to the indoor (vehicle interior) by a duct not shown in the drawing to regulate (adjust) the indoor temperature.

In this cooling air conditioning operation, the four-way valve 19 and the three-way valve 20 are connected as shown in FIG. 4, the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. The expansion valve 22A is fully closed so that no air conditioning coolant flows into the intermediate heat exchanger 4. In other words, the outdoor heat exchanger 2 serves as a condenser and the indoor air conditioning heat exchanger 7 serves as an evaporator.

After the air conditioning coolant compressed by the compressor 1, is liquefied by the heat discharge from the outdoor heat exchanger 2, the air conditioning coolant passes through the fully opened expansion valve 23 and flows into the indoor air conditioning heat exchanger 7. The air conditioning coolant flowing into the indoor air conditioning heat exchanger 7 is depressurized by the expansion valve 22B and reaches a low temperature, low pressure state, and evaporates due to the absorption of heat from the air suctioned in the air in/out 43A in the indoor air conditioning heat exchanger 7, and returns by way of the three-way valve 20 to the compressor 1. The air cooled in this way by heat exchange in the indoor air conditioning heat exchanger 7 is blown from the air in/out port 43B to the interior of the vehicle.

In order to adjust the temperature of the air blown from the air in/out port 43B, the air flow of the internal fan 8, the rotation speed of the compressor 1, the degree of opening of the expansion valve 22B, and the air flow of the outdoor fan 3 may be regulated. If the blown air is a higher temperature than the target temperature, the air flow of the indoor fan 8 may be increased, the rotation speed of the compressor 1 may be increased, the degree of opening of the expansion valve 22B may be widened, and the air flow of the indoor fan 8 may be increased. On the other hand, if the blown air is a lower temperature than the target temperature, the air flow of the indoor fan 8 may be decreased, the rotation speed of the compressor 1 may be decreased, the degree of opening of the expansion valve 22B may be narrowed, and the air flow of the outdoor fan 3 may be decreased. Not all of the actuators need be controlled, and just controlling at least one actuator is sufficient.

(5) Cooling Air Conditioning and Machine Cooling Operation

Figure 5:
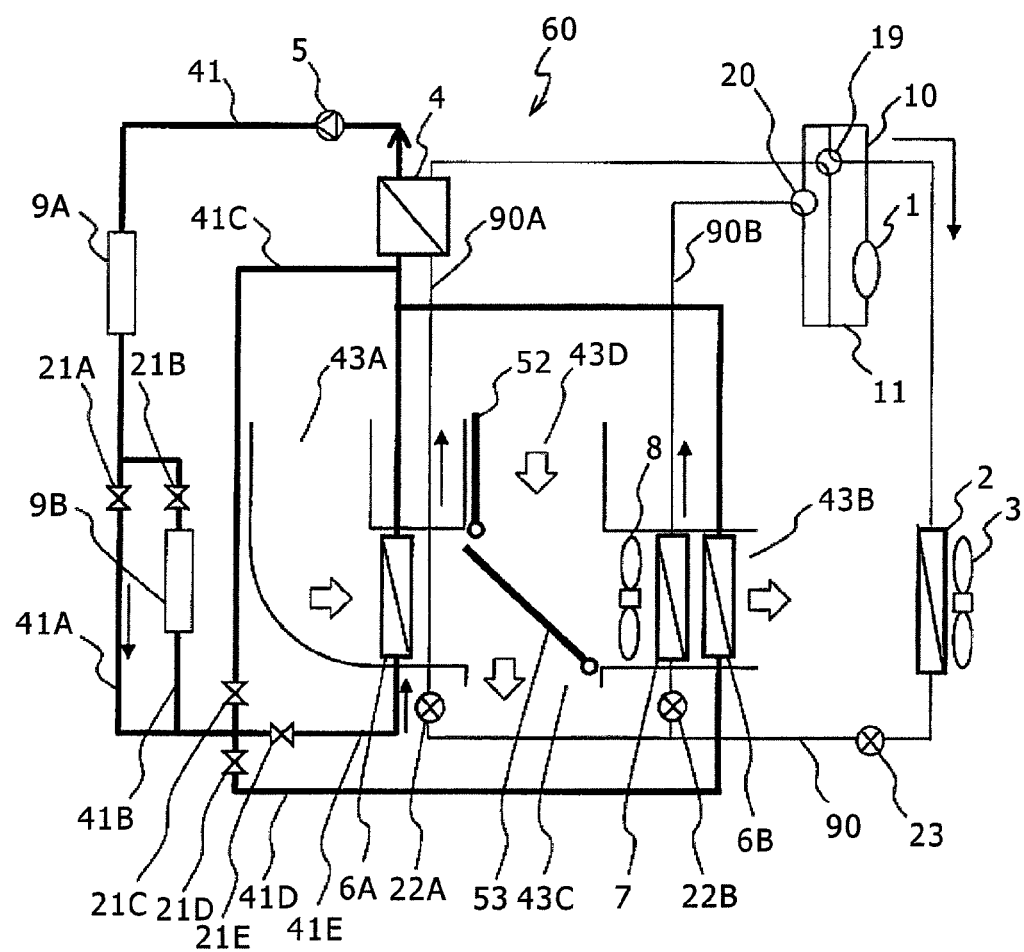
FIG. 5 is a drawing showing the overall structure of the air conditioner 60 of the first embodiment in the mode for cooling air conditioning and machine cooling operation.

The cooling air conditioning and machine cooling operation is an operation to cool the heating element 9, and to cool air condition the interior and are described while referring to FIG. 5. This operation includes the case where cooling the machine coolant circulating in the machine coolant circuit 41 just by using the indoor cooling heat exchanger 6A, and the case where cooling the machine coolant by using the indoor cooling heat exchanger 6A and the intermediate heat exchanger 4.

The machine coolant circuit 41 is rendered to circulate machine coolant driven by the pump 5 in the indoor cooling heat exchanger 6A and the intermediate heat exchanger 4 by closing the two-way valves 21C, 21D, and opening the two-way valve 21E. If the two-way valve 21A is opened, and the two-way valve 21B is closed, machine coolant flows in the machine coolant circuit 41A, and if the two-way valve 21A is closed and the two-way valve 21B is opened then machine coolant flows in the machine coolant circuit 41B. If cooling both the heating elements 9A and 9B, the two-way valve 21A is closed, and the two-way valve 21B is opened.

The switching dampers 52, 53 within the indoor unit 42 are set as shown in FIG. 5, so that the air suctioned in by the air in/out port 43A passes through the indoor cooling heat exchanger 6A and is blown from the air in/out port 43C. The air in/out port 43C is rendered not to blow air inside by way of a duct not shown in the drawing. Moreover the air suctioned in from the air in/out port 43D by the indoor fan 8 passes through the indoor air conditioning heat exchanger 7 and is blown from the air in/out port 43B. The passage of air through the indoor cooling heat exchanger 6A cools the machine coolant. The air passing through the indoor air conditioning heat exchanger 7 is cooled by the indoor air conditioning heat exchanger 7 and that cooled air is blown inside (inside the vehicle).

In this cooling air conditioning and machine cooling operation, the four-way valve 19 and the three-way valve 20 are connected as shown in FIG. 5, the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. Namely, the outdoor heat exchanger 2 serves as a condenser and the intermediate heat exchanger 4 and the indoor air conditioning heat exchanger 7 serve as an evaporator.

After the air conditioning coolant compressed by the compressor 1, is liquefied by the heat discharged by the outdoor heat exchanger 2, the air conditioning coolant passes through the fully opened expansion valve 23 and flows into the intermediate heat exchanger 4 and the indoor air conditioning heat exchanger 7. The air conditioning coolant flowing into the intermediate heat exchanger 4 is depressurized by the expansion valve 22A and reaches a low temperature, low pressure state, and evaporates due to the absorption of heat from the machine coolant in the machine coolant circuit 41 in the intermediate heat exchanger 4, and returns to the compressor 1 by way of the four-way valve 19. Heat exchange between the machine coolant and air conditioning coolant takes place in this way in the intermediate heat exchanger 4 and cools the machine coolant. The air conditioning coolant flowing into the indoor air conditioning heat exchanger 7, is depressurized by the expansion valve 22B, reaches a low temperature, low pressure state, evaporates due to absorption of heat from the air suctioned in by the air in/out port 43D in the indoor air conditioning heat exchanger 7, and returns to the compressor by way of the three-way valve 20. The air that was heat-exchanged and cooled by the indoor air conditioning heat exchanger 7 in this way is blown inside the vehicle from the air in/out port 43B.

As shown above, the cooling air conditioning of the vehicle interior and the cooling of the heating element 9 can both be achieved at the same time by utilizing both the intermediate heat exchanger 4 and the indoor air conditioning heat exchanger 7 as an evaporator. The intermediate heat exchanger 4 and the indoor air conditioning heat exchanger 7 are moreover connected in parallel with the intake pipe 11 of compressor 1, and the expansion valves 22A, 22B are mounted on the refrigerating cycle circuit 90A, 90B so that the flow rates of air conditioning coolant flowing to the intermediate heat exchanger 4 and the indoor air conditioning heat exchanger 7 can be varied as needed. The temperature of the machine coolant and the temperature of the air conditioning coolant can consequently be regulated to their respective desired temperatures. The temperature of machine coolant flowing inside the heating element 9 can therefore be maintained at a high temperature by suppressing the coolant flow rate flowing into the intermediate heat exchanger 4 even when the temperature of the air conditioning coolant was sufficiently lowered in order to carry out cooling air conditioning.

The indoor cooling heat exchanger 6A and intermediate heat exchanger 4 can cool the machine coolant as described above. If the machine coolant is a lower temperature than the specified temperature, the machine coolant is cooled only in the indoor cooling heat exchanger 6A without utilizing the refrigerating cycle circuit 90; and if the machine coolant is a higher temperature than a specified temperature the machine coolant is cooled by the indoor cooling heat exchanger 6A and intermediate heat exchanger 4 utilizing the refrigerating cycle circuit 90. This control is implemented by control to adjust the degree of opening of the expansion valve 22A. If the expansion valve 22A is fully closed then the air conditioning coolant does not flow to the intermediate heat exchanger 4 so that only the indoor cooling heat exchanger 6A cools the machine coolant.

The air flow of the indoor fan 8, the flow rate of the pump 5, the rotation speed of the compressor 1, the degree of opening of the expansion valves 22A, 22B, and the air flow of the outdoor fan 3 may be regulated in order to control the machine coolant temperature and the temperature of the air blown from the air in/out ports 43B. If the machine coolant is a higher temperature than the target temperature or the air that is blown is a higher temperature than the target temperature, the air flow of the indoor fan 8 may be increased, the flow rate of the pump 5 may be increased, the rotation speed of the compressor 1 may be increased, the degree of opening of expansion valves 22A, 22B may be widened, and the air flow of the outdoor fan 3 may be increased. On the other hand, if the machine coolant is a lower temperature than the target temperature or the blown air is a lower temperature than the target temperature, the air flow of the indoor fan 8 may be decreased, the flow rate of the pump 5 may be decreased, the rotation speed of compressor 1 may be decreased, the degree of opening of expansion valves 22A, 22B may be narrowed, and the air flow of the outdoor fan 3 may be decreased. Not all of the actuators need be regulated, and regulating at least one of the actuators is sufficient.

(6) Heating Air Conditioning Operation

Figure 6:
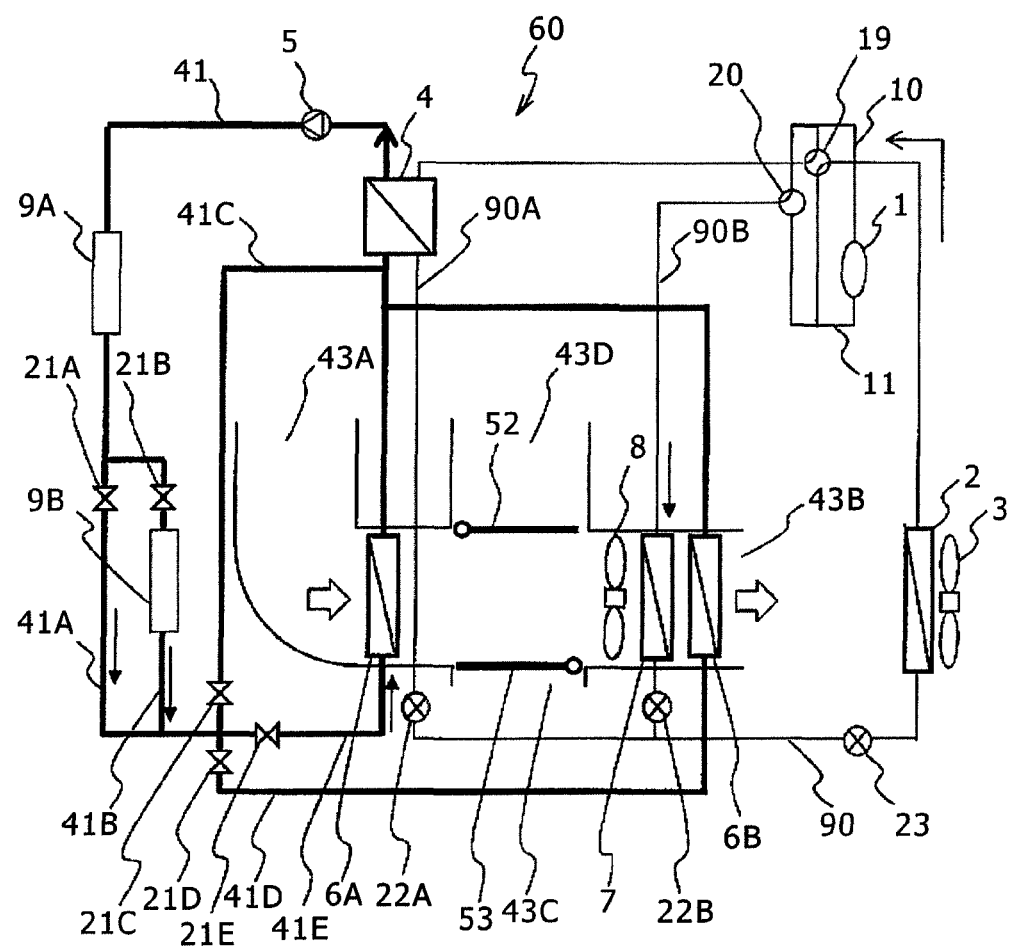
FIG. 6 is a drawing showing the overall structure of the air conditioner 60 of the first embodiment in the mode for heating air conditioning operation.

Heating air conditioning operation is an operation to warm the interior air of the vehicle without cooling the heating element 9 and is described while referring to FIG. 6.

The machine coolant circuit 41 allows machine coolant driven by the pump 5 to flow in the indoor cooling heat exchanger 6A and intermediate heat exchanger 4 by opening the two-way valve 21E and closing the two-way valves 21C, 21D. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B.

The switching dampers 52, 53 within the indoor unit 42 are set as shown in FIG. 6 so that the air suctioned in by the air in/out port 43A passes through the indoor cooling heat exchanger 6A, the indoor air conditioning heat exchanger 7, the indoor cooling heat exchanger 6B and is blown out from the air in/out port 43B. Machine coolant warmed by the heating element 9 circulates in this indoor cooling heat exchanger 6A so that the temperature of the air passing through the indoor cooling heat exchanger 6A rises. The air in/out port 43B connects to the interior (inside of vehicle) and adjusts the interior temperature.

If the heating load is small, the waste heat from the heating element 9 can be utilized for heating air conditioning as described above so that the refrigeration cycle circuit 90 is not used for heating air conditioning. Utilizing this waste heat allows air conditioning that cuts energy consumption. Closing the two-way valve 21A, and opening the two-way valve 21B allows the machine coolant flow in the machine coolant circuit 41B and utilizing the waste heat from the heating element 9B for heating air conditioning so that energy consumption can be even further suppressed.

If the waste heat from the heating elements 9A, 9B is not sufficient to handle the heating load, the refrigerating cycle circuit 90 can be jointly added to the waste heat from the heating elements 9A, 9B. In that case, the four-way valve 19 and the three-way valve 20 are connected as shown in FIG. 6, the dispensing valve 10 of compressor 1 is connected to the intermediate heat exchanger 4 and the indoor air conditioning heat exchanger 7, and the intake pipe 11 is connected to the outdoor heat exchanger 2. The expansion valve 22A is fully closed, the expansion valve 22B is fully opened, so that no air conditioning coolant flows in the intermediate heat exchanger 4 and flows only in the indoor air conditioning heat exchanger 7. In other words, the indoor air conditioning heat exchanger 7 serves as a condenser, and the outdoor heat exchanger 2 serves as an evaporator.

The air conditioning coolant compressed by the compressor 1 is condensed and liquefied by heat discharge in the indoor air conditioning heat exchanger 7. Next, after depressurization in the expansion valve 23, the air conditioning coolant is evaporated and gasified by heat exchange with the vehicle outside air in the outdoor heat exchanger 2 and returned to the compressor 1.

The air suctioned in by the air in/out port 43A as described above, is heated in the indoor cooling heat exchanger 6A by the machine coolant flowing in the machine coolant circuit 41. Also, the air further heated by heat exchange in the indoor air conditioning heat exchanger 7 mounted on the downstream side is blown from the air in/out port 43B to the inside. The air blown to the inside in this way is therefore further heated in refrigerating cycle circuit 90 after being heated by waste heat from the heating element 9. The heating of the air by utilizing this refrigerating cycle circuit 90 supplements the heated air temperature that might not be fully heated by waste heat from the heating element 9 to attain an air conditioning device having minimal energy consumption.

In order to regulate the air temperature of the air blown from the air in/out port 43B, the air flow of the indoor fan 8, the flow rate of the pump 5, the rotation speed of the compressor 1, the degree of opening of the expansion valve 22B, and air flow of the outdoor fan 3 may be regulated. If the blown air is a lower temperature than the target temperature, the air flow of the indoor fan 8 may be increased, the flow rate of the pump 5 may be increased, the rotation speed of the compressor 1 may be increased, the degree of opening of the expansion valve 22B may be widened, and the air flow of the indoor fan 3 may be increased. On the other hand, if the blown air is a higher temperature than the target temperature, the air flow of the indoor fan 8 may be decreased, the flow rate of the pump 5 may be decreased, the rotation speed of the compressor 1 may be decreased, the degree of opening of the expansion valve 22B may be narrowed, and the air flow of the indoor fan 3 may be decreased. Not all of the actuators need be regulated, and regulating at least one of the actuators is sufficient.

(7) Heating Air Conditioning and Machine Cooling Operation

Figure 7:
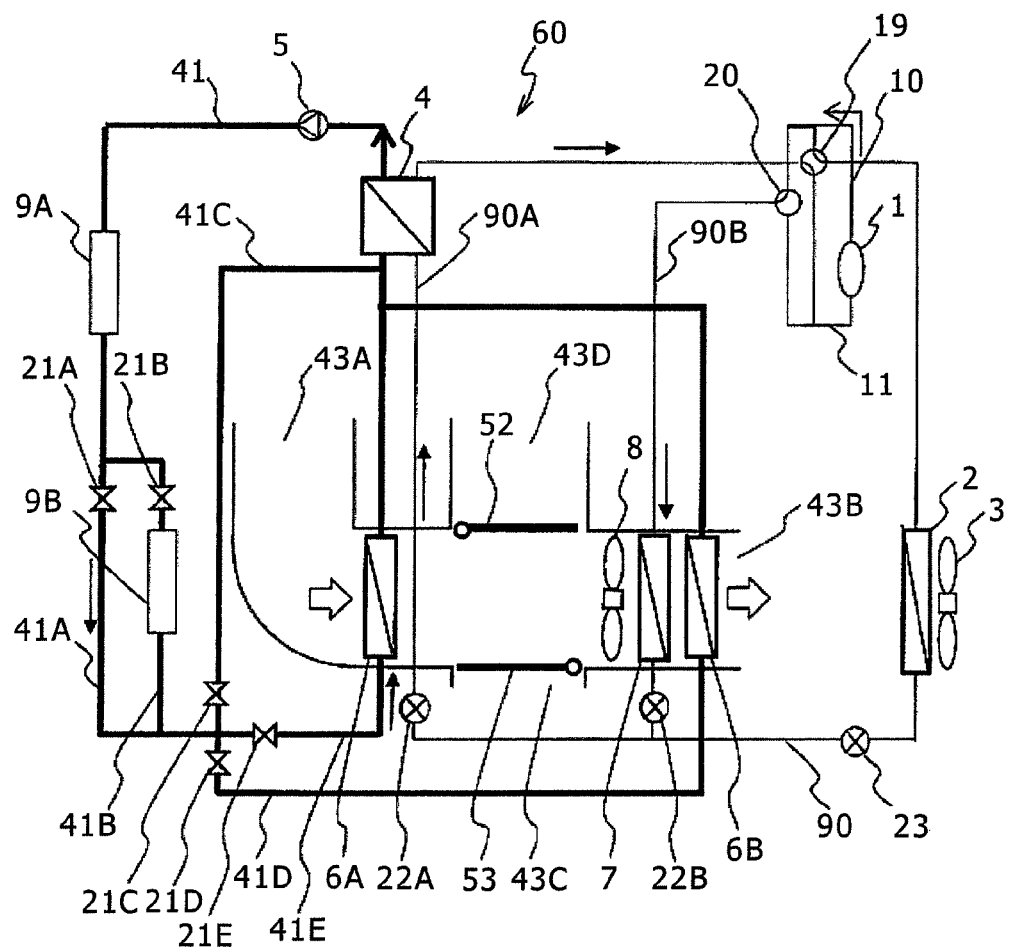
FIG. 7 is a drawing showing the overall structure of the air conditioner 60 of the first embodiment in the mode for heating air conditioning and machine cooling operation.

The heating air conditioning and machine cooling operation is an operation to cool the heating element 9 and heat the interior of the vehicle, and is described while referring to FIG. 7. As described above for heating air conditioning operation, if the machine coolant can be maintained at the target temperature or below by heat discharge in the indoor cooling heat exchanger 6A then a temperature rise in the heating element 9 can be prevented. However, if the heat discharged from the indoor cooling heat exchanger 6A is inadequate or if temporarily lowering the temperature of the machine coolant as described later on then the machine cooling by utilizing the refrigerating cycle circuit 90 is required.

In this heating air conditioning and machine cooling operation, the four-way valve 19 and the three-way valve 20 are connected as shown in FIG. 7, the dispensing pipe 10 of compressor 1 connects to the outdoor heat exchanger 2 and the indoor air conditioning heat exchanger 7, and the intake pipe 11 connects to the intermediate heat exchanger 4. The expansion valve 23 is fully closed, and the expansion valve 22B fully opened to prevent the air conditioning coolant from flowing into the outdoor heat exchanger 2. Namely, the indoor air conditioning heat exchanger 7 functions as a condenser and the intermediate heat exchanger 4 functions as an evaporator.

The air conditioning coolant compressed by the compressor 1 is condensed and liquefied by the heat discharged in the indoor air conditioning heat exchanger 7. Next, after depressurization in the expansion valve 22A, the air conditioning coolant is evaporated and gasified by heat exchange with the machine coolant flowing in the machine coolant circuit 41 in the intermediate heat exchanger 4, and returned to the compressor 1. Heat exchange between the machine coolant and the air conditioning coolant take place in the intermediate heat exchanger 4, which cools the machine coolant.

The machine coolant circuit 41 allows machine coolant driven by the pump 5 to flow in the indoor cooling heat exchanger 6A and the intermediate heat exchanger 4 by opening the two-way valve 21E, and closing the two-way valves 21C, 21D. If the two-way valve 21A is opened, and the two-way valve 21B is closed, the machine coolant flows into the machine coolant circuit 41A; and if the two-way valve 21A is closed and the two-way valve 21B is opened then the machine coolant flows in the machine coolant circuit 41B.

The switching dampers 52, 53 within the indoor unit 42 are set as shown in FIG. 7, so that the air suctioned in by the air in/out port 43A passes through the indoor cooling heat exchanger 6A, indoor air conditioning heat exchanger 7, and indoor cooling heat exchanger 6B and is blown from the air in/out port 43B. The machine coolant heated by the heating element 9 is circulated in this indoor cooling heat exchanger 6A, so that the temperature of the air passing through the indoor cooling heat exchanger 6A rises.

The air further heated by the heat exchange in the indoor air conditioning heat exchanger 7 mounted downstream is blown to inside the vehicle from the air in/out port 43B. The air blown to the inside in this way is therefore further heated by the refrigerating cycle circuit 90 after being heated by waste heat from the heating element 9. The air in/out port 43B connects to the inside (vehicle interior) by way of a duct not shown in the drawing, to adjust the inside temperature.

The machine coolant can be cooled by heat discharge from the indoor cooling heat exchanger 6A and heat exchange by the intermediate heat exchanger 4. The air flow of the indoor fan 8, the flow rate in the pump 5, the rotation speed of the compressor 1, the degree of opening of the expansion valve 22A may be regulated to control the temperature of the air blown from the air in/out port 43B and the temperature of the machine coolant. If the machine coolant is a higher temperature than a target temperature or the blown air is a lower temperature than the target temperature, the air flow of the indoor fan 8 may be increased, the flow rate of the pump 5 may be increased, the rotation speed of the compressor 1 may be increased, and the degree of opening of the expansion valve 22A may be widened. On the other hand, if the coolant is a lower temperature than the target temperature, or the blown air is a higher temperature than the target temperature, the air flow of the indoor fan 8 may be decreased, the flow rate of the pump 5 may be decreased, the rotation speed of the compressor 1 may be decreased, the degree of opening of the expansion valve 22A may be narrowed. Not all of the actuators need be regulated, and regulating at least one of the actuators is sufficient.

(8) Dehumidifying Operation

Figure 8:
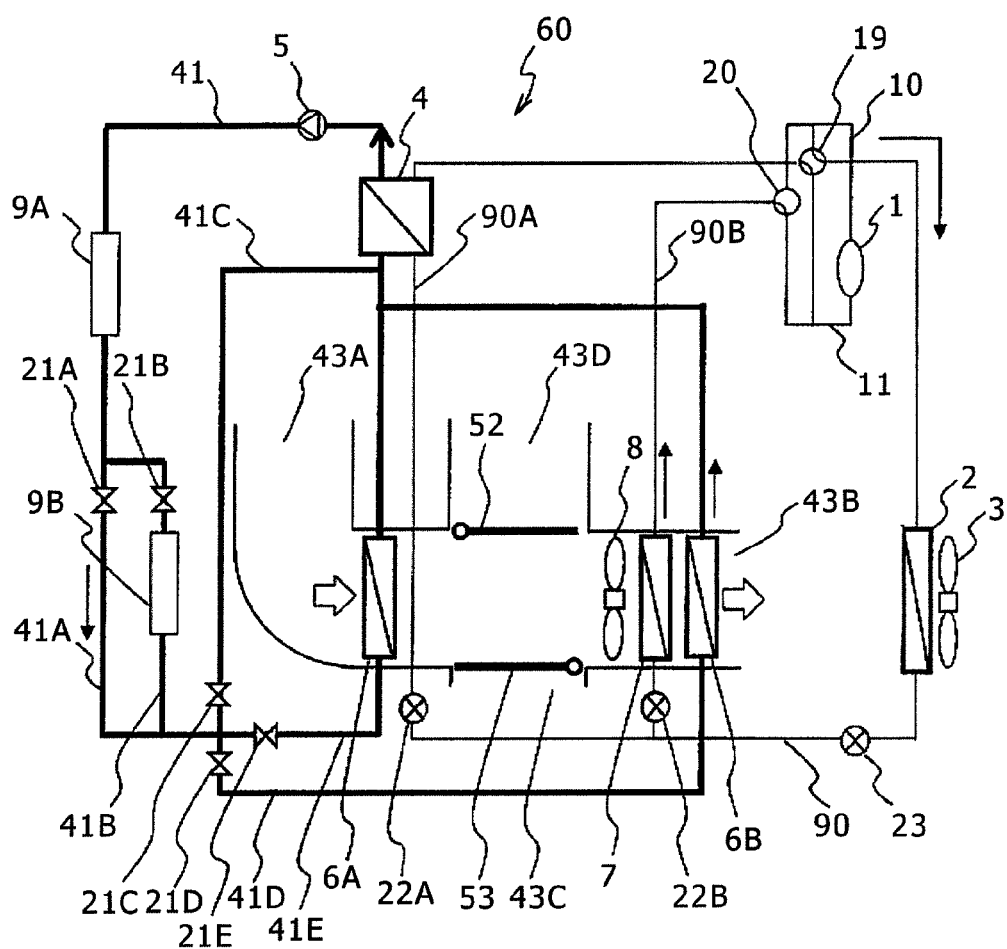
FIG. 8 is a drawing showing the overall structure of the air conditioner 60 of the first embodiment in the mode for dehumidifying operation.

The dehumidifying operation is an operation to remove the inside humidity and is described while referring to FIG. 8.

In the dehumidifying operation, the four-way valve 19 and the three-way valve 20 are connected as shown in FIG. 8, the dispensing pipe 10 of the compressor 1 connects to the outdoor heat exchanger 2, and the intake pipe 11 of the compressor 1 connects to the intermediate heat exchanger 4 and the indoor air conditioning heat exchanger 7. Fully closing the expansion valve 22A and fully opening the expansion valve 23 prevents the air conditioning coolant from flowing in the intermediate heat exchanger 4. In other words, the outdoor heat exchanger 2, functions as a condenser, and the indoor air conditioning heat exchanger 7 functions as an evaporator.

After the air conditioning coolant compressed by the compressor 1, is liquefied by heat discharge in the outdoor heat exchanger 2, the air conditioning coolant passes through the fully open expansion valve 23 and flows into the indoor air conditioning heat exchanger 7. The air conditioning coolant flowing into the indoor air conditioning heat exchanger 7 is depressurized by the expansion valve 22B and reaches a low temperature, low pressure state, and evaporates due to the absorption of heat from the air suctioned into the air in/out port 43A in the indoor air conditioning heat exchanger 7, and returns to the compressor 1 by way of the three-way valve 20.

The machine coolant circuit 41 allows machine coolant driven by the pump 5 to flow in the indoor cooling heat exchanger 6B and intermediate heat exchanger 4 by opening the two-way valve 21D, and closing the two-way valves 21C and 21E. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B.

The switching dampers 52, 53 within the indoor unit 42 are set as shown in FIG. 8, so that the air suctioned in by the air in/out port 43A passes through the indoor cooling heat exchanger 6A, indoor air conditioning heat exchanger 7, and indoor cooling heat exchanger 6B and is blown from the air in/out port 43B. The air that was suctioned in by the air in/out port 43A is dehumidified and cooled by heat exchange in the indoor air conditioning heat exchanger 7. The machine coolant heated by the heating element 9 is circulated in this indoor cooling heat exchanger 6B, so that the temperature of the air passing through the indoor cooling heat exchanger 6B rises. So-called reheat dehumidifying operation is in this way possible. The relative humidity of the air supplied to inside the vehicle is in this way lowered so that the interior space becomes more comfortable. The air in/out port 43B connects to the inside (vehicle interior) by way of a duct not shown in the drawing, to adjust the inside temperature.

The heat source for the indoor cooling heat exchanger 6B utilized as the reheating device is the waste heat generated by the heating element 9. So unlike the case where utilizing a heater or other device for reheating, there is no need to apply new energy and therefore the interior of the vehicle can be made more comfortable without having to increase the power consumption.

The air flow of the indoor fan 8, the flow rate of the pump 5, the rotation speed of the compressor 1, the degree of opening of the expansion valve 22B, and the air flow of the outdoor fan 3 may be regulated in order to control the reheat quantity. To increase the reheat quantity, the air flow of the indoor fan 8 may be increased, the flow rate of the pump 5 may be increased, the rotation speed of the compressor 1 may be increased, the degree of opening of the expansion valve 22D may be widened, and the air flow of the indoor fan 8 may be increased. On the other hand, if decreasing the reheat quantity, the air flow of the indoor fan 8 may be decreased, the flow rate of the pump 5 may be decreased, the rotation speed of the compressor 1 may be decreased, the degree of opening of the expansion valve 22B may be narrowed, and the air flow of the outdoor fan 3 may be decreased. Not all of the actuators need be controlled, and just controlling at least one actuator is sufficient.

(9) Heating Air Conditioning and Dehumidifying Operation

Figure 9:
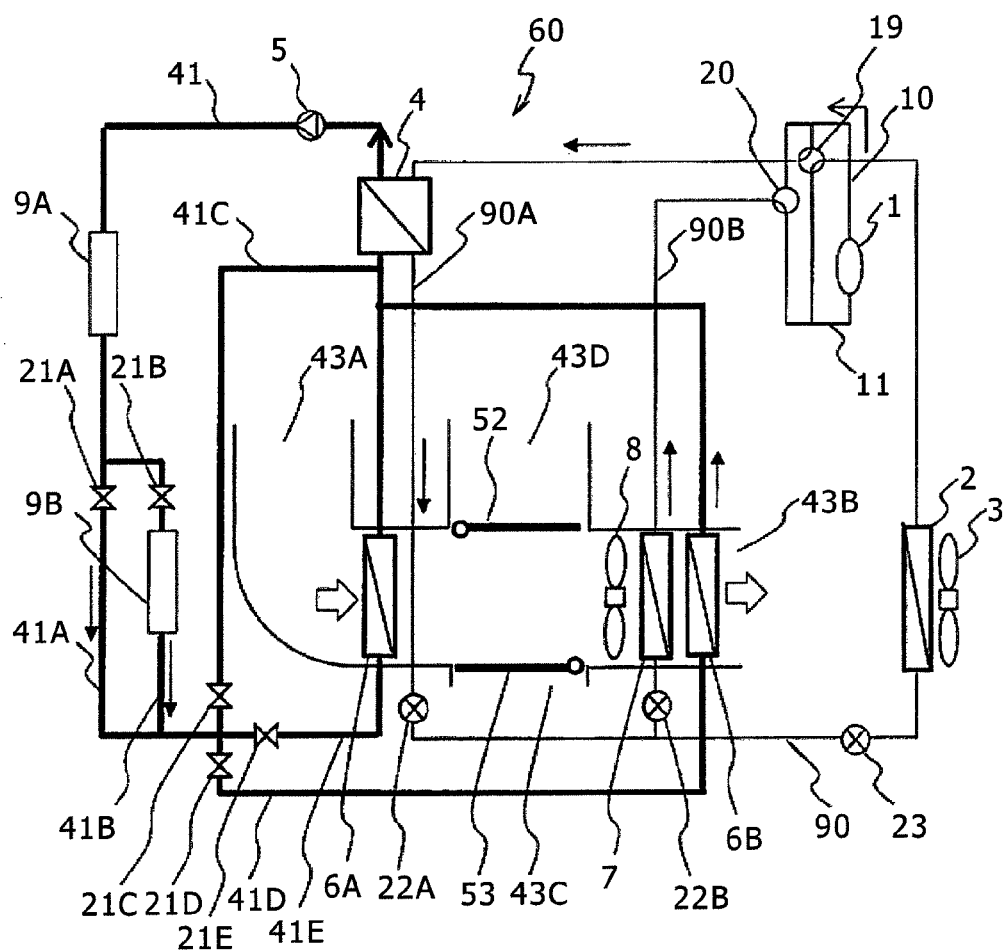
FIG. 9 is a drawing showing the overall structure of the air conditioner 60 of the first embodiment in the mode for heating air conditioning and dehumidifying operation.

The heating air conditioning and dehumidifying is an operation to heat the interior and to dehumidify, and is described while referring to FIG. 9.

In the heating air conditioning and dehumidifying operation, the four-way valve 19 and the three-way valve 20 are connected as shown in FIG. 9, the dispensing pipe 10 of the compressor 1 connects to the intermediate heat exchanger 4, and the intake pipe 11 of the compressor 1 connects to the outdoor heat exchanger 2 and the indoor air conditioning heat exchanger 7. Fully opening the expansion valve 22A, and fully closing the expansion valve 23 prevents the air conditioning coolant from flowing into the outdoor heat exchanger 2. In other words, the intermediate heat exchanger 4 functions as a condenser, and the indoor air conditioning heat exchanger 7 functions as an evaporator.

After the air conditioning coolant compressed by the compressor 1, is liquefied by heat discharge from the intermediate heat exchanger 4, the air conditioning coolant passes through the fully opened expansion valve 22A and flows into the indoor air conditioning heat exchanger 7. The air conditioning coolant flowing into the indoor air conditioning heat exchanger 7 is depressurized by the expansion valve 22B and reaches a low temperature, low pressure state, and evaporates due to the absorption of heat from the air suctioned into the air in/out port 43A in the indoor air conditioning heat exchanger 7, and returns to the compressor 1 by way of the three-way valve 20. In the intermediate heat exchanger 4, heat exchange takes place between the machine coolant and the air conditioning coolant so that the machine coolant is heated.

The machine coolant circuit 41 allows machine coolant driven by the pump 5 to flow in the intermediate heat exchanger 4 and indoor cooling heat exchanger 6B by opening the two-way valve 21D, and closing the two-way valves 21C and 21E. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B. If a large amount of waste heat from the heating element 9 is utilized, then the two-way valve 21A should be closed and the two-way valve 21B should be opened.

The switching dampers 52, 53 within the indoor unit 42 are set as shown in FIG. 9, so that the air suctioned in by the air in/out port 43A passes through the indoor cooling heat exchanger 6A, indoor air conditioning heat exchanger 7, and indoor cooling heat exchanger 6B and is blown from the air in/out port 43B. The air that was suctioned in by the air in/out port 43A is dehumidified and cooled by heat exchange in the indoor air conditioning heat exchanger 7. The machine coolant heated by the heating element 9 and the intermediate heat exchanger 4 is circulated in this indoor cooling heat exchanger 6B, so that the temperature of the air passing through the indoor cooling heat exchanger 6B rises. The heating air conditioning and dehumidifying operation is in this way possible. The air in/out port 43B connects to the inside (vehicle interior) by way of a duct not shown in the drawing, to adjust the inside temperature.

In order to regulate the temperature of the air blown from the air in/out port 43B, the air flow of the indoor fan 8, the flow rate of the pump 5, the rotation speed of the compressor 1, the degree of opening of the expansion valve 22B may be regulated. If the blown air is a lower temperature than the target temperature, the air flow of the indoor fan 8 may be increased, the flow rate of the pump 5 may be increased, the rotation speed of the compressor 1 may be increased, and the degree of opening of the expansion valve 22B may be widened. However, if the blown air is a higher temperature than the target temperature, the air flow of the indoor fan 8 may be decreased, the flow rate of the pump 5 may be decreased, the rotation speed of the compressor 1 may be decreased, and the degree of opening of the expansion valve 22B may be narrowed. Not all of the actuators need be regulated, and regulating at least one of the actuators is sufficient.

(10) Machine Heating Operation

The heating element 9 must sometimes be pre-warmed in situations as engine starting in winter season with low outside air temperatures. Machine heating operation is an operation to warm the heating element 9 without utilizing the indoor air conditioning and is described while referring to FIG. 10.

Figure 10:
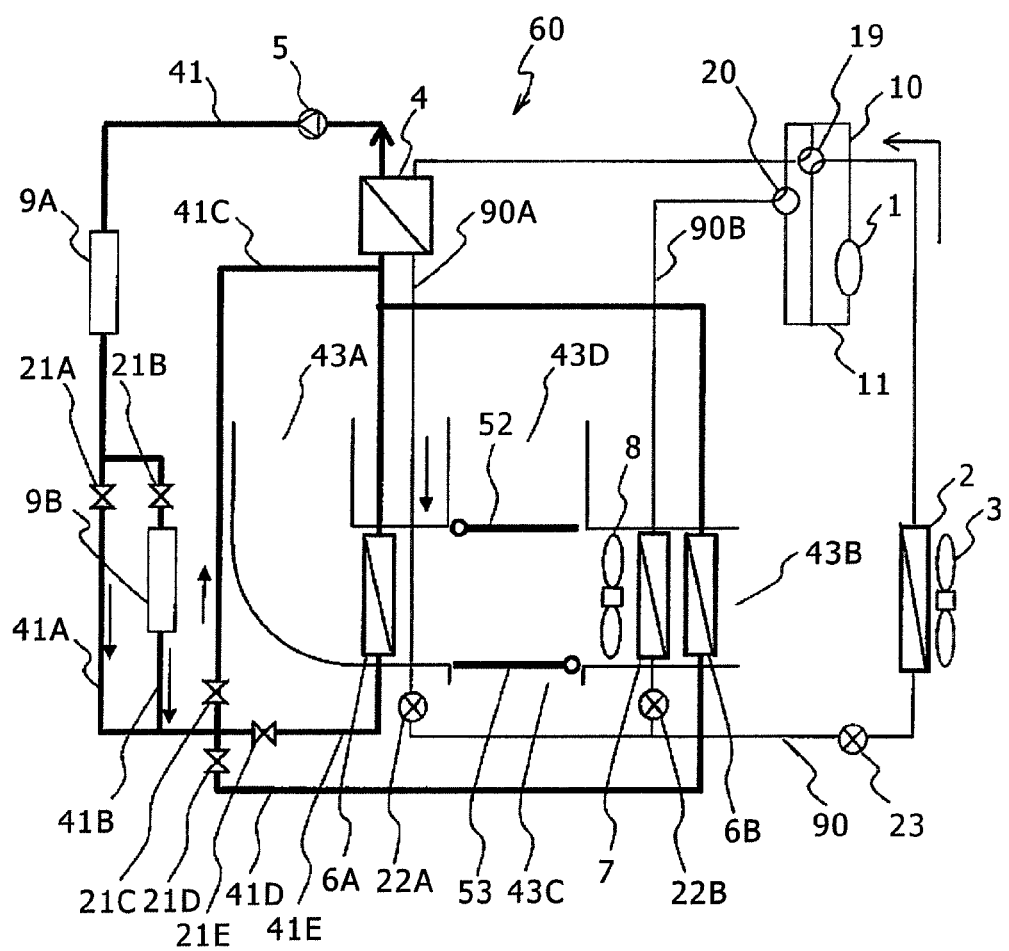
FIG. 10 is a drawing showing the overall structure of the air conditioner 60 of the first embodiment in the mode for machine heating operation.

In machine heating operation, the four-way valve 19 and the three-way valve 20 are connected as shown in FIG. 10, and the dispensing pipe 10 of the compressor 1 is connected to the intermediate heat exchanger 4 and the indoor air conditioning heat exchanger 7, and the intake pipe 11 of the compressor 1 is connected to the outdoor heat exchanger 2. Fully opening the expansion valve 22A and fully closing the expansion valve 22B prevents the air conditioning coolant from flowing into the indoor air conditioning heat exchanger 7. In other words, the intermediate heat exchanger 4 functions as a condenser and the outdoor heat exchanger 2 functions as an evaporator.

After the air conditioning coolant compressed by the compressor 1, is liquefied by heat radiating from the intermediate heat exchanger 4, the air conditioning coolant passes through the fully opened expansion valve 22A and flows into the outdoor heat exchanger 2. The air conditioning coolant flowing into the outdoor heat exchanger 2 is depressurized by the expansion valve 23 and reaches a low temperature, low pressure state, and evaporates due to the absorption of heat from the outside air in the outdoor heat exchanger 2, and returns to the compressor 1. In the intermediate heat exchanger 4, heat exchange takes place between the machine coolant and the air conditioning coolant so that the machine coolant is heated.

The machine coolant circuit 41 closes the two-way valves 21D, 21E, and opens the two-way valve 21C to prevent machine coolant driven by the pump 5 from flowing into the indoor cooling heat exchanger 6A and 6B. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B. The two-way valve 21A or 21B is opened to allow the machine coolant to flow to the heating element 9 for heating. The refrigerating cycle circuit 90 heats the machine coolant so that the heating element 9 can be heated by circulating this machine coolant.

The indoor unit 42 does not suction in air or dispense air and does not drive the indoor fan 8. Also, the indoor cooling heat exchangers 6A and 6B, and the indoor air conditioning heat exchanger 7 do not respectively allow machine coolant and air conditioning coolant to flow so there is no heat exchange.

The flow rate of the pump 5, the rotation speed of compressor 1, the degree of opening of the expansion valve23, and the air flow of the outdoor fan 3 may be regulated in order to control the heating quantity. The flow rate of the pump 5 may be increased, the rotation speed of the compressor 1 may be increased, the degree of opening of the expansion valve 23 may be widened, and the air flow of the outdoor fan 3 may be increased in order to increase the heat quantity. On the other hand, the flow rate of the pump 5 may be decreased, the rotation speed of the compressor 1 may be decreased, the degree of opening of the expansion valve 23 may be narrowed, and the air flow of the outdoor fan 3 may be decreased in order to decrease the heat quantity. Not all of the actuators need be regulated, and regulating at least one of the actuators is sufficient.

The forming of frost on the outdoor heat exchanger 2 is unavoidable in the heating air conditioning operation shown in FIG. 6 and the machine heating operation shown in FIG. 10. Defrosting operation is an operation to temporarily switch from heating air conditioning operation and machine heating operation to remove frost on the outdoor heat exchanger 2 and is described while referring to FIG. 11.

(11) Defrosting Operation

Figure 11:
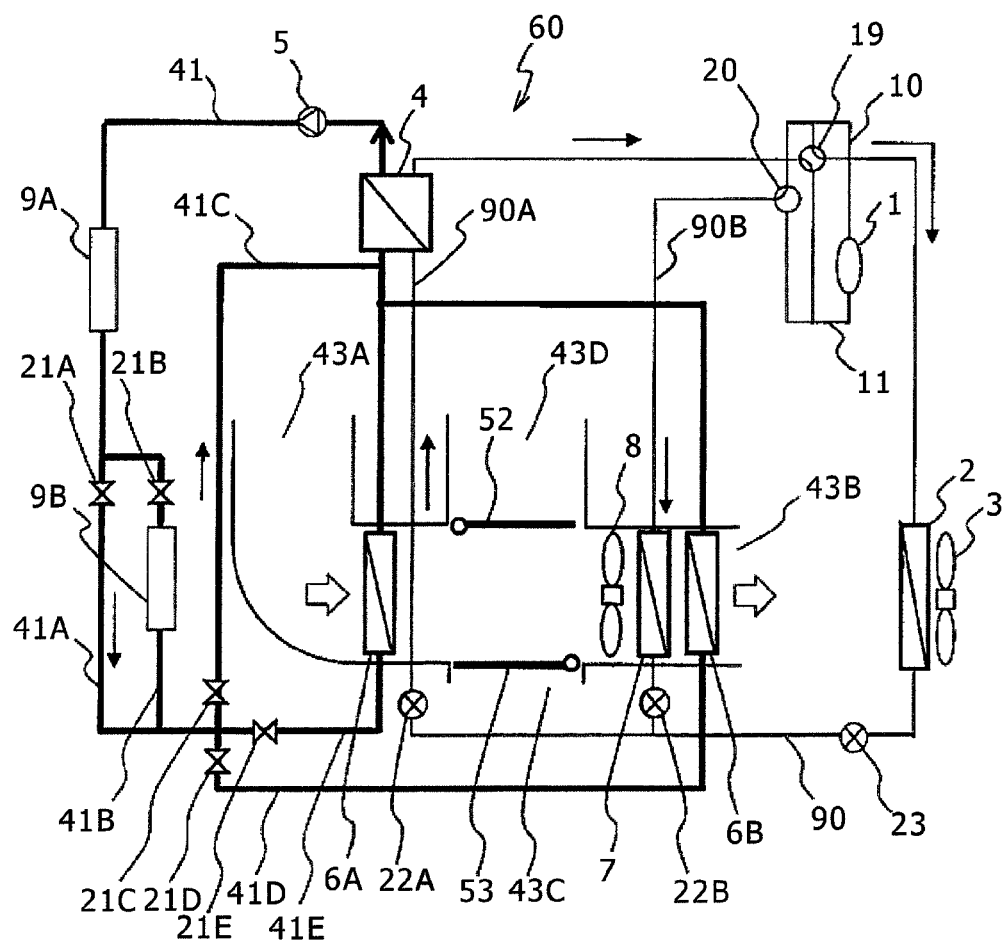
FIG. 11 is a drawing showing the overall structure of the air conditioner 60 of the first embodiment in the mode defrosting operation.

In the defrosting operation, the four-way valve 19 and the three-way valve 20 are connected as shown in FIG. 11, and the dispensing pipe 10 of the compressor 1 is connected to the outdoor heat exchanger 2 and the indoor air conditioning heat exchanger 7, and the intake pipe 11 of the compressor 1 is connected to the intermediate heat exchanger 4. The expansion valves 23, 22B are set to fully open. In other words, the outdoor heat exchanger 2 and the indoor air conditioning heat exchanger 7 function as condensers and the intermediate heat exchanger 4 functions as an evaporator.

After the air conditioning coolant compressed by the compressor 1, is liquefied by heat discharge in the outdoor heat exchanger 2 and the indoor air conditioning heat exchanger 7, the air conditioning coolant passes through the fully opened expansion valves 22B, 23 and flows into the intermediate heat exchanger 4. The frost attached to the outdoor heat exchanger 2 can in this way be removed. The air conditioning coolant flowing into the intermediate heat exchanger 4 is depressurized by the expansion valve 22A and reaches a low temperature, low pressure state, and evaporates due to absorption of heat in the intermediate heat exchanger 4, and returns to the compressor 1. In the intermediate heat exchanger 4, heat exchange takes place between the machine coolant and the air conditioning coolant so that the machine coolant is cooled.

The machine coolant circuit 41 closes the two-way valves 21D, 21E, and opens the two-way valve 21C to prevent the machine coolant driven by the pump 5 from flowing into the indoor cooling heat exchangers 6A and 6B. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B. The refrigerating cycle 90 cools the machine coolant so that the heating element 9 can be cooled by circulating this machine coolant.

The switching dampers 52, 53 within the indoor unit 42 are set as shown in FIG. 11, so that the air suctioned in by the air in/out port 43A passes through the indoor cooling heat exchanger 6A, indoor air conditioning heat exchanger 7, and indoor cooling heat exchanger 6B and is blown from the air in/out port 43B. The machine coolant is not circulated within the indoor cooling heat exchangers 6A and 6B so that there are no fluctuations in the temperature of the air passing through the indoor cooling heat exchangers 6A, 6B.

The air suctioned in by the air in/out port 43A is heated by heat exchange in the indoor air conditioning heat exchanger 7 and is blown from the air in/out port 43B to inside the vehicle. Warm air can in this way be blown inside the vehicle even during defrosting operation. The air in/out port 43B connects to the inside of the vehicle (vehicle interior) by way of a duct not shown in the drawing and adjusts the temperature inside the vehicle.

The blowing of the heated air inside the vehicle can also be prevented. In the above structure, fully closing the expansion valve 22B and not driving the indoor fan 8 will prevent the air blow.

In order to regulate the amount of defrosting, the air flow of the indoor fan 8, the flow rate of the pump 5, the rotation speed of the compressor 1, the degree of opening of the expansion valve 22A, and the air flow of the outdoor fan 3 may be controlled. To increase the amount of defrosting, the air flow of the indoor fan 8 may be increased, the flow rate of the pump 5 may be increased, the rotation speed of the compressor 1 may be increased, the degree of opening of the expansion valve 22A may be widened, and the air flow of the outdoor fan 3 may be increased. On the other hand, to lower the amount of defrosting, the air flow of the indoor fan 8 may be decreased, the flow rate of the pump 5 may be decreased, the rotation speed of the compressor 1 may be decreased, the degree of opening of the expansion valve 22A may be narrowed, and the air flow of the outdoor fan 3 may be decreased. Not all of the actuators need be regulated, and regulating at least one of the actuators is sufficient.

(12) Reason for Changing the Indoor Cooling Heat Exchanger Utilized According to the Operating Mode The above described operating description switches the flow of air in the indoor unit 42 according to the operating mode. The reason is described next.

Figure 12:
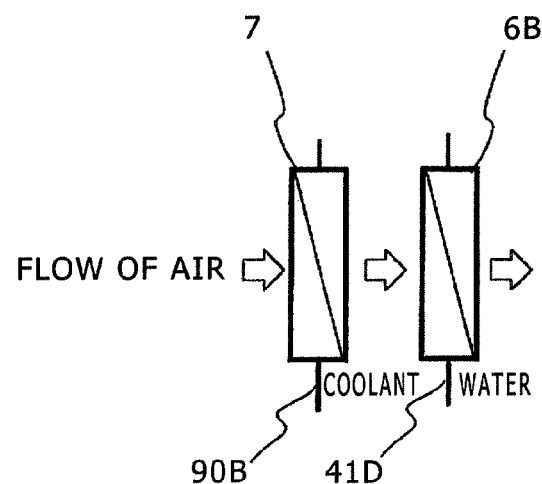
FIG. 12 is a drawing showing the indoor air conditioning heat exchanger 7 and the indoor cooling heat exchanger 6B arrangement in the present invention.
Figure 13:
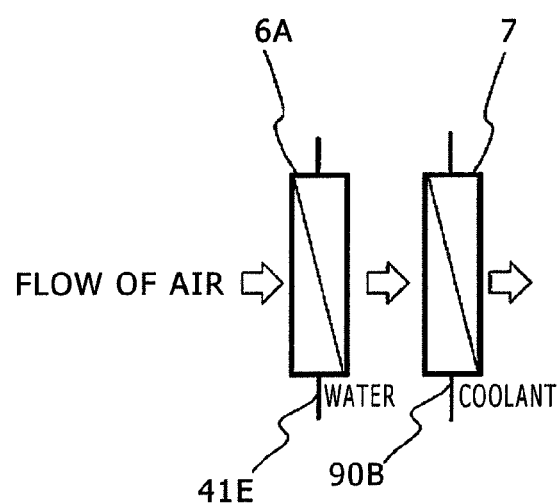
FIG. 13 is a drawing showing the indoor air conditioning heat exchanger 7 and the indoor cooling heat exchanger 6A arrangement in the present invention.

When dehumidifying, as shown in FIG. 12, the air must first be cooled and dehumidified in the indoor air conditioning heat exchanger 7, and the air next warmed in the indoor cooling heat exchanger 6B. Here, the case where the heating air conditioning utilizes the waste heat of the heating element 9 in the heat exchangers arrayed as shown in FIG. 12 is described. When air flows in sequence through the indoor air conditioning heat exchanger 7 and the indoor cooling heat exchanger 6B as shown in FIG. 12, the temperature of the air heated in the indoor air conditioning heat exchanger 7 will drop in the indoor cooling heat exchanger 6B in a state where the machine coolant was not sufficiently warmed. So if the temperature of the machine coolant flowing into the indoor cooling heat exchanger 6B is low in this way, the machine coolant is set so as not to flow into the indoor cooling heat exchanger 6B. In other words, heating air conditioning operation that utilizes the waste heat is not performed. In view of this state, the air should preferably pass in sequence through the indoor cooling heat exchanger 6A and the indoor air conditioning heat exchanger 7 as shown in FIG. 13. The reason is that the air temperature in the indoor air conditioning heat exchanger 7 can be raised even further, after the air temperature was raised by the machine coolant in the indoor cooling heat exchanger 6A. If the temperature of the machine coolant is raised even slightly by the heating element 9, then heating air conditioning operation that utilizes the waste heat can be implemented. An air conditioning system with low energy consumption can in this way be achieved.

As described above, dehumidifying operation is not performed during the passage of air as shown in FIG. 13. The heat exchange is therefore switched to the indoor cooling heat exchanger 6A or (indoor cooling heat exchanger) 6B according to the operating mode. In other words, heat exchange is switched to the indoor cooling heat exchanger 6B as shown in FIG. 12 for dehumidifying operation and heating air conditioning and dehumidifying operation; and heat exchange is switched to the indoor cooling heat exchanger 6A as shown in FIG. 13 for all other operating modes.

In the case of the machine cooling as shown in FIG. 3 and FIG. 5, and also if not warming the vehicle interior, the switching dampers 52, 53 are installed so that the air warmed by heat exchange in the indoor cooling heat exchanger 6A does not enter the vehicle interior.

(13) Indoor Unit Placement

The structure of the indoor unit 42 is described next while referring to FIG. 14.

Figure 14:
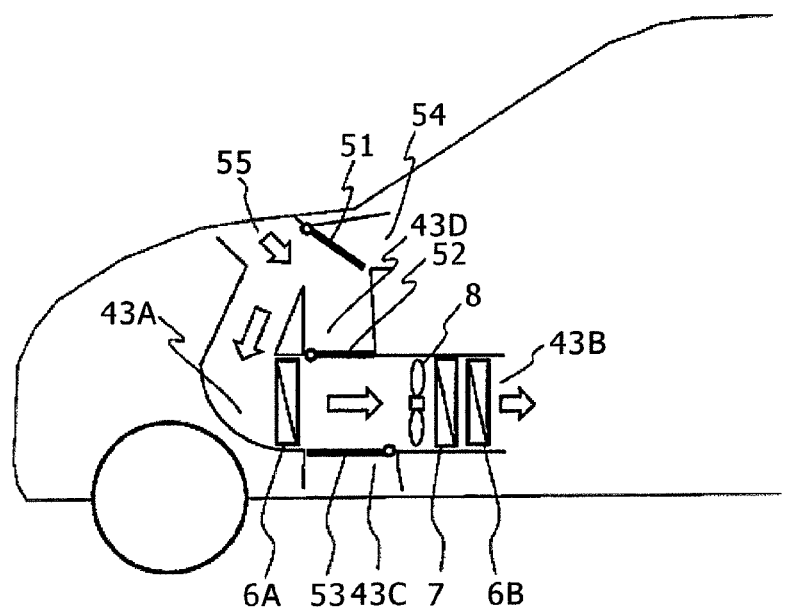
FIG. 14 is a drawing showing the overall structure of the indoor unit switching damper in the states for outer air feed, and blowing of intake air to inside the vehicle.

The indoor unit 42 as shown in FIG. 14, is comprised of the indoor cooling heat exchangers 6A, 6B in which the machine coolant flows to perform heat exchange with the air, the indoor air conditioning heat exchanger 7 in which the air conditioning coolant flows to perform heat exchange with the air, the indoor fan 8 for suction of air into the indoor unit 42, and the switching dampers 52, 53 for switching the flow of air within the indoor unit 42.

The indoor cooling heat exchangers 6A, 6B are respectively installed on the upstream and downstream sides of the indoor air conditioning heat exchanger 7; and the switching dampers 52, 53 and the indoor fan 8 are installed between the indoor air conditioning heat exchanger 7 and the indoor cooling heat exchanger 6A. The indoor unit 42 suctions air by way of the indoor fan 8 from the air intake ports 43A and 43D and blows air from the air dispensing ports 43B, 43C. The switching damper 51 is installed on the upstream side of the air intake ports 43A and 43D and switches between suctioning in air to the inside from the indoor air intake port 54 or suctioning in air from the outside from the outdoor air intake port 55. The air dispensing port 43B for blowing air into the interior (inside of vehicle), and the air blow to the inside is switchable to sections such as the driver's feet section or the front glass by way of a duct not shown in the drawing. The air dispensing port 43C blows air to the outside (outside of vehicle) by way of a duct not shown in the drawing.

The switching damper 52 is capable of adjusting the air flow suctioned from the air intake port 43D, and is able to vary the degree of the damper opening. The air suctioned in from the air intake port 43D passes through the indoor air conditioning heat exchanger 7 and the indoor cooling heat exchanger 6B without passing through the indoor cooling heat exchanger 6A, and is blown out from the air dispensing port 43B into the interior (inside of vehicle).

The switching damper 53 blows the air suctioned from the air intake port 43A to outside the vehicle from the air dispensing port 43C or to the inside (interior of vehicle) from the air dispensing port 43B after passing through the indoor cooling heat exchanger 6A.

The indoor cooling heat exchanger 6A, switching damper 53, air dispensing port 43C, and outdoor air intake port 55 are mounted outside (within the engine frame), and are capable of blowing air to outside the vehicle without the air from air dispensing port 43C flowing inside the vehicle.

(14) Indoor Unit Operation (Difference Per Operating Mode)

The operation of the indoor unit is described next while referring to FIG. 14 through FIG. 17.

In a state with the switching dampers 51, 52, 53 set as shown in FIG. 14, the outside air from outside of the vehicle suctioned in by the outdoor air intake port 55 is blown from the air dispensing port 43B to inside the vehicle. This switching damper 51 position is a setting for carrying out the so-called intake of outside air. Cooling air conditioning (AC), heating air conditioning (AC), heating (AC) and machine cooling, dehumidifying, heating (AC) and dehumidifying, and defrosting operations are performed in this damper setting.

Figure 15:
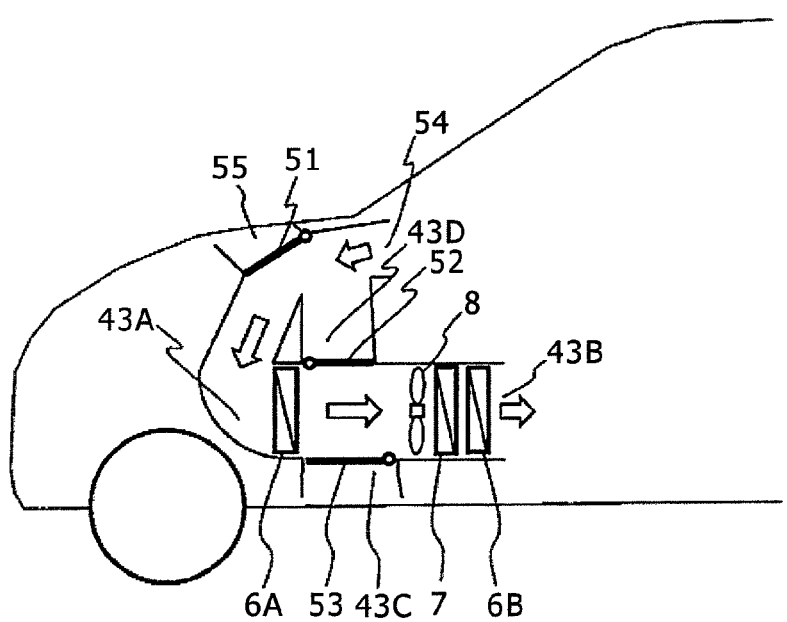
FIG. 15 is a drawing showing the overall structure of the indoor unit switching damper in the states for inner air circulation and blowing of intake air to inside the vehicle.

In a state with the switching dampers 51, 52, 53 set as shown in FIG. 15, the inside air suctioned inside by the indoor air intake port 54 is blown from the air dispensing port 43B to inside the vehicle. This switching damper 51 position is a setting for carrying out the so-called internal air circulation. Cooling air conditioning (AC), heating air conditioning (AC), heating (AC) and machine cooling, dehumidifying, heating (AC) and dehumidifying, and defrosting operations are performed in this damper setting.

Figure 16:
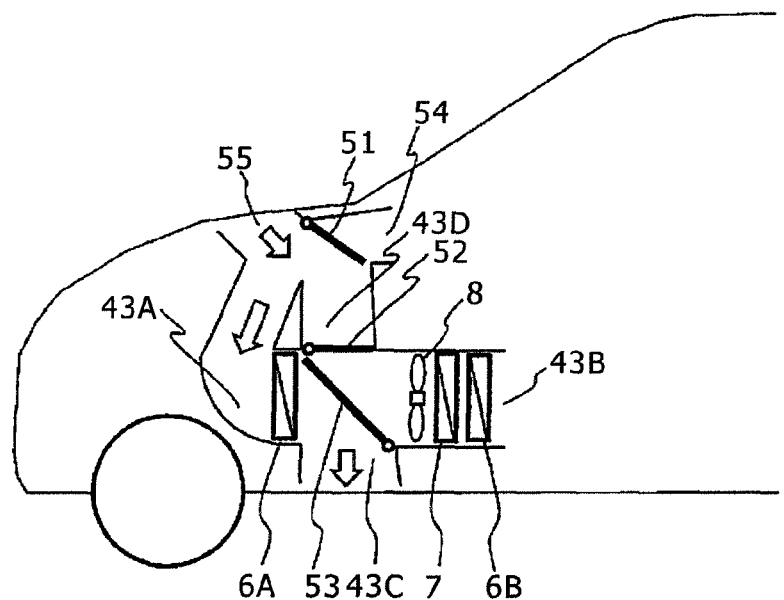
FIG. 16 is a drawing showing the overall structure of the indoor unit switching damper in the states for outer air feed, and blowing of intake air to outside the vehicle.

In a state with the switching dampers 51, 52, 53 set as shown in FIG. 16, the outer air from outside the vehicle suctioned inside by the outdoor air intake port 55 is blown from the air dispensing port 43C to outside the vehicle. This switching damper 51 position is a setting for carrying out the so-called intake of outside air. Machine cooling operation is carried out in this damper setting.

Figure 17:
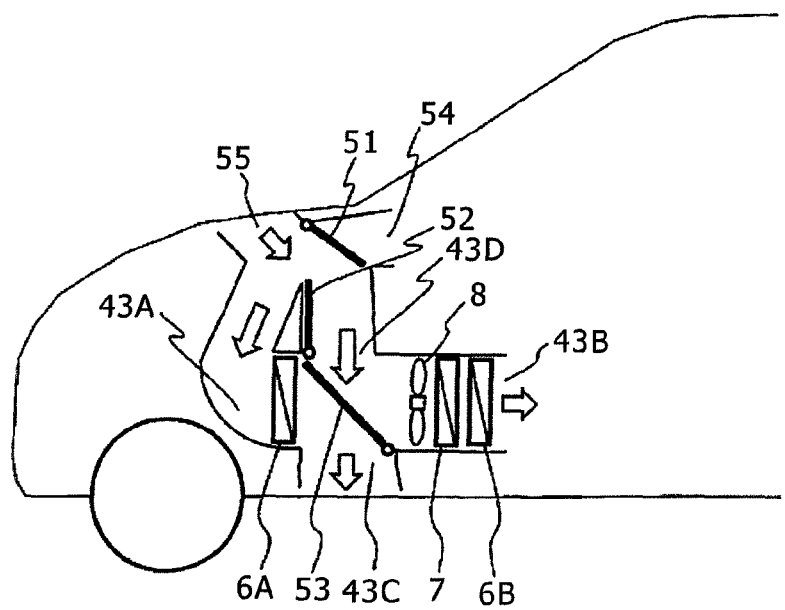
FIG. 17 is a drawing showing the overall structure of the indoor unit switching damper in the states for outer air feed, and blowing of intake air to inside the vehicle and outside the vehicle.

In a state with the switching dampers 51, 52, 53 set as shown in FIG. 17, the outer air from outside of the vehicle suctioned inside by the outdoor air intake port 55 is blown from the air dispensing port 43B to inside the vehicle, and blown to the outside from the air dispensing port 43C. The position of this switching damper 51 is a setting for carrying out the so-called intake of outside air however may also circulate the internal air. Cooling air conditioning and machine cooling operation are carried out in this damper setting.

One example of the indoor unit 42 structure was shown above however other structures may be utilized if the same effect can be obtained.

(15) Heating Element Description

The heating element 9 mounted in the machine coolant circuit 41 is a device necessary for adjusting the temperature to within a specified range during vehicular operation in devices mounted in the vehicle. A specific example of a heating element 9 includes a drive motor 73, an inverter 72 for driving that drive motor 73, a drive battery 76, and a gearbox mounted in the drive system.

When adjusting the temperature of the heating element 9 mounted in the machine coolant circuit 41, those temperature adjustments must be made according to the temperature characteristics of each device. FIG. 18 is a list showing the conditions for the object for temperature adjustment. The vehicle interior and the heating element 9 are objects for temperature adjustment, and the motor 73, inverter 72, battery 76, and gearbox are shown for the heating element 9.

The interior of the vehicle is air conditioned as needed by cooling/heating air conditioning and dehumidifying based on the temperature settings and the outside air temperature, etc. However, the air conditioning may be stopped or weakened in some cases in order to cool the heating element 9.

The temperature of the motor 73 and inverter 72 generally become higher when generating a high torque. The high torque output time must therefore be limited in order to not to exceed the specified temperature range. The high torque output time can be extended by boosting the cooling performance of the motor 73 and inverter 72. The temperature of the machine coolant circulating within the motor 73 and inverter 72 is regulated for example to 60° C. or below.

The temperature of the battery 76 is preferably maintained within a specified temperature range in order to exhibit satisfactory charging-discharging performance or in other words to improve the charging-discharging efficiency. Warming up (machine heating) is therefore required when the battery cell temperature is low (for example during engine starting when the outside temperature is low), and cooling is required when the battery cell temperature has become too high due to the heat emitted from the battery itself.

The parallel rows of gear teeth in the gearbox are in a state where steeped in lubricating oil. The viscosity of the lubricating oil within the gearbox case affects the (mechanical) loss during driving, and when the lubricating oil temperature is low (during engine starting when the outside temperatures is low, etc.) so that the stirring (or agitation) loss increases when the gears stir the lubricating oil. Conversely, when the lubricating oil temperature is too high, a satisfactory oil film cannot form on the intermeshing surfaces of the gear teeth so there is large friction loss. Warming up (machine heating) is therefore necessary during cold season (or winter season) engine starting and heat discharge from the gearbox must be promoted when the lubricating oil temperature is high.

(16) Heating Element Placement Description

Figure 19:
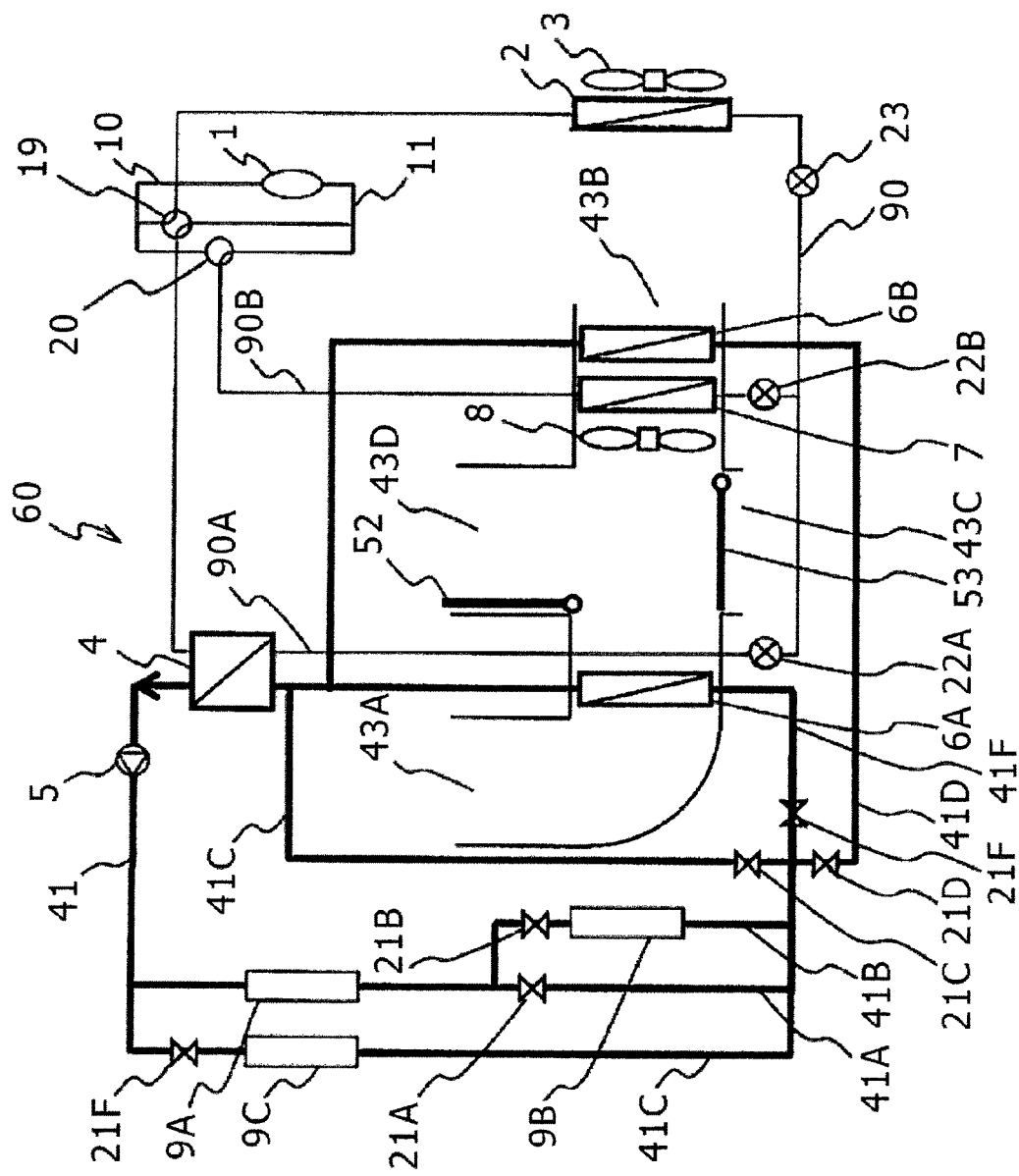
FIG. 19 is a drawing showing another example of arrangement different from FIG. 2, as the heating element of the present invention.

FIG. 19 is a drawing showing placement of the heating element 9 that is different from FIG. 2. Plural heating elements may be installed, or may be placed in a parallel, or may be placed in series in the machine coolant circuit 41.

In the case where the heating elements 9 are arrayed in parallel, the devices may be grouped into devices requiring warm up (battery 76, gearbox) and devices not requiring warm up (inverter 72, motor 73). In the structure in FIG. 19, the inverter 72 and motor 72 for example are the heating element 9A, the battery 76 is the heating element 9C, and the gearbox is the heating element 9B. The two-way valves 21A, 21B, 21F are installed in each of the device cooling circuits. Utilizing this type of placement allows adjusting to a satisfactory temperature on each line.

All of the heating elements can be placed in parallel however such a placement is not desirable since an increased number of parts are utilized. Moreover, the battery 76 and gearbox may be arrayed in series however in view of the fact that in a typical vehicle mounting state the drive battery is typically mounted below the seat, and the gearbox is installed in the vicinity of the drive shaft, the structure as shown in FIG. 19 is preferable.

When arraying the heating elements in series, the lower the temperature setting of the heating element the farther upstream it is placed relative to the flow of the machine coolant. Placement examples of the heating element 9 are shown in FIG. 2 and FIG. 19 but the same placement need not always be required and another placement may be utilized if the same effect is obtained.

In the present embodiment, employing the above structure for the air conditioner 60, allows separately regulating the machine cooling and heating of heating elements 9 such as the vehicular air conditioner and motor and inverter. The air conditioning control device 61 can control the air conditioner 60 so that the vehicle interior temperature and the temperature of devices requiring temperature adjustment can attain their respective temperature settings.

(17) Control Flow

In the present invention, air conditioning control device 61 as shown in FIG. 1, loads the vehicle operating information (vehicle speed information, acceleration opening information, etc.) and drive schedule information 65, and controls the air conditioner 60 based on that information and the temperature 63 for devices requiring temperature adjustment and the vehicle indoor temperature 62. This flow for example, predicts temperature fluctuations in the vehicle interior and device requiring temperature adjustment and by changing the temperature settings for the air conditioning coolant and machine coolant in advance based on that prediction, can efficiently perform cooling and warm up in each device for ideal control of the device temperatures.

Figure 20:
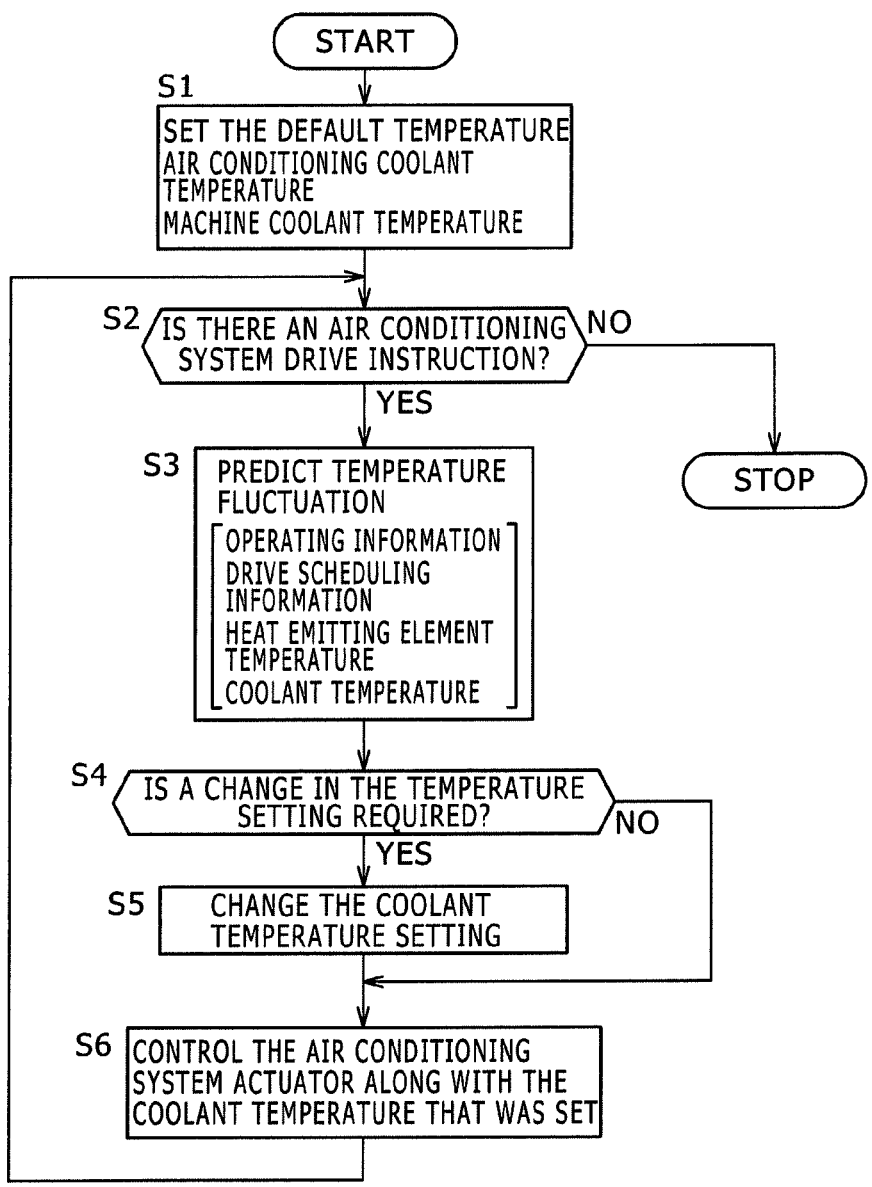
FIG. 20 is a flowchart of the control processing program in the air conditioning control device 61 of the present invention.

FIG. 20 is a flowchart of the control processing program in the air conditioning control device 61. The microcomputer installed in the air conditioning control device 61 implements the processing shown in FIG. 20 in sequence, by the software processing. Turning on the vehicle ignition key switch starts the processing of the program shown in FIG. 20 by the microcomputer.

In step S1, the processing sets the default temperature setting for the air conditioning coolant utilized for the vehicular air conditioning and the machine coolant utilized in the cooling and heating of the heating element 9. The default temperature for example is a temperature assumed correct for driving on a level road at a specified speed and a normal outside air temperature.

In step S2, the processing decides whether there is an air conditioning system drive instruction. If the vehicular air conditioning system is a driven by a structure on and off vehicle switching, then the presence of an air conditioning system drive instruction is determined by whether the vehicle on/off switch has been set to on or not. If a NO is decided in step S2, the program in FIG. 20 ends. However if a YES was decided in step S2, then the processing proceeds to step S3.

In step S3, temperature fluctuations in the vehicle, heating element or air conditioning coolant or machine coolant that are the objects for temperature adjustment are predicted based on at least one from among the vehicle operating information 64, the (drive) schedule information 65, detection temperature of each heating element 9 and detection temperature of the coolant.

In step S4, a decision is made on whether the temperature setting of the air conditioning coolant and machine coolant must be changed based on the predicted temperature fluctuation found in step S3.

If decided in step S4 that the temperature setting must be changed, the processing proceeds to step S5, changes the coolant temperature setting, and the processing proceeds to step S6. On the other hand, if the predicted temperature is calculated and decided that no change is necessary, then step S5 is skipped and the processing proceeds to step S6.

In step S6, each actuator of the air conditioner 60 shown in FIG. 1 is controlled so as to change the current temperature of the coolant based on the changed temperature setting.

In the above description, the processing attempted to change the temperature setting of the coolant in step S4 through step S6, however the temperature setting of the heating element 9 (within vehicle, each device) may be changed instead.

(18) Changing the Heating Element Temperature Setting

The vehicle status and the changing the temperature setting of the heating element 9 serving as the object requiring temperature adjustment is described while referring to FIG. 21. The vehicle status is based on the vehicle operating information 64 which includes detection signals from acceleration sensor and vehicle speed sensor, and (drive) schedule information 65 from the navigation device. In FIG. 21, nine types of vehicle status including: during charging, before starting driving, before vehicle starts moving, acceleration/deceleration and before and during driving mountain roads, during driving on ordinary roads, before and during driving on high-speed roads, before temporary stops (e.g. waiting for signal to change, traffic jams, etc.), before vehicle stops, while vehicle is stopped were described, however the objects for air conditioning are not limited to these vehicle states. Moreover, the objects for air conditioning are the vehicle interior, motor, inverter, battery, and gearbox.

The driver's intent (to accelerate, etc.) can be determined from the vehicle operating information 64 (vehicle speed, acceleration opening). The (drive) schedule information 65 is road information (traffic jam situation, road gradient) to the target destination and target destination information from the navigation device. The amount of heat emitted from the heating element 9 is predicted from the expected motor output and vehicle internal air conditioning output, and changes made to temperature setting within the vehicle and temperature setting for the object device for temperature adjustment.

If the driver intention to accelerate is for example predicted from the vehicle operating information 64, then the temperature setting for the motor and inverter are lowered in order to cool motor and inverter beforehand. If mountain road driving is predicted from the (drive) schedule information 65 then the temperature setting for the motor and the inverter is lowered below the default setting. The default setting is a setting assumed for ordinary driving on a level road. The flow of machine coolant is regulated and heating or cooling air conditioning performed so as to reach a specified temperature range for satisfactory charging/discharging without changing the battery temperature setting. The gearbox temperature setting is also left unchanged.

During charging, the (engine) warm-up or the cooling is regulated so that the battery temperature during charging reaches the specified temperature range without changing the temperature setting. There is no cooling-heating air conditioning and no cooling or warm-up of the vehicle interior, motor, inverter, and gearbox.

Before starting driving, this status assumes that the battery of the parked vehicle will be charged from the AC power supply. In this case, the interior of the vehicle is cooled or heated by air conditioning from an AC power supply in advance so that the vehicle interior temperature will be comfortable before driving starts.

In a vehicle state before the vehicle starts moving, all objects for temperature adjustment are set to a state with no changes in temperature setting in order to prepare for immediate driving, (for driving just after starting) and battery cooling and warm-up, and gearbox warm-up performed. Before driving the vehicle, the battery and gearbox are warmed up the same as before starting driving or the vehicle starts moving, in order to boost efficiency during driving.

When the vehicle status is ordinary road driving or in other words in a standard vehicle state, then a state is set where no temperature setting changes are made to all objects for temperature adjustment.

Also, for vehicle states during driving and before driving on high speed roads, the motor output increases the same as during mountain road driving so that the air conditioning and temperature settings are regulated the same as when driving mountain roads.

In a temporarily stopped state such as waiting for signal to change or in traffic jams, the heat emitted by the motor and inverter is lower compared to the state when driving, so that the temperature does not rise even with smaller cooling performance, and consequently the motor and inverter temperature setting rises in order to weaken the cooling performance. Consequently, energy can be saved and the temperature range of the battery temperature setting is widened.

In a state where stopping of the vehicle is expected (before stopping) from the drive schedule information such as when arriving at the target destination, the temperature settings for the motor, inverter, and battery are set the same as for before a temporary stop. However, since driving of the vehicle is predicted to stop, the cooling and heating air conditioning inside the vehicle and the cooling and warm-up of the gearbox are stopped in advance to save energy.

Moreover, when the vehicle is stopped, the cooling/heating air conditioning of the vehicle interior and the cooling and warm-up of all devices that are objects for temperature adjustment are stopped.

In a state where air conditioning of the vehicle interior and cooling or warm-up of each device are performed, priority is given to cooling or warm-up of each device rather than air conditioning of the vehicle interior, when the temperature of each device is near the upper temperature limit.

In the control shown in the flow chart described in FIG. 20, the temperature fluctuation is predicted in step S3, and the temperature setting (target temperature) of the coolant changed based on the that prediction data. However, the vehicle status shown in FIG. 21 can be predicted from the vehicle operating information 64 and the (drive) schedule information and changing the temperature setting may be directly determined from that prediction data.

(19) EV Control Device Description

Figure 22:
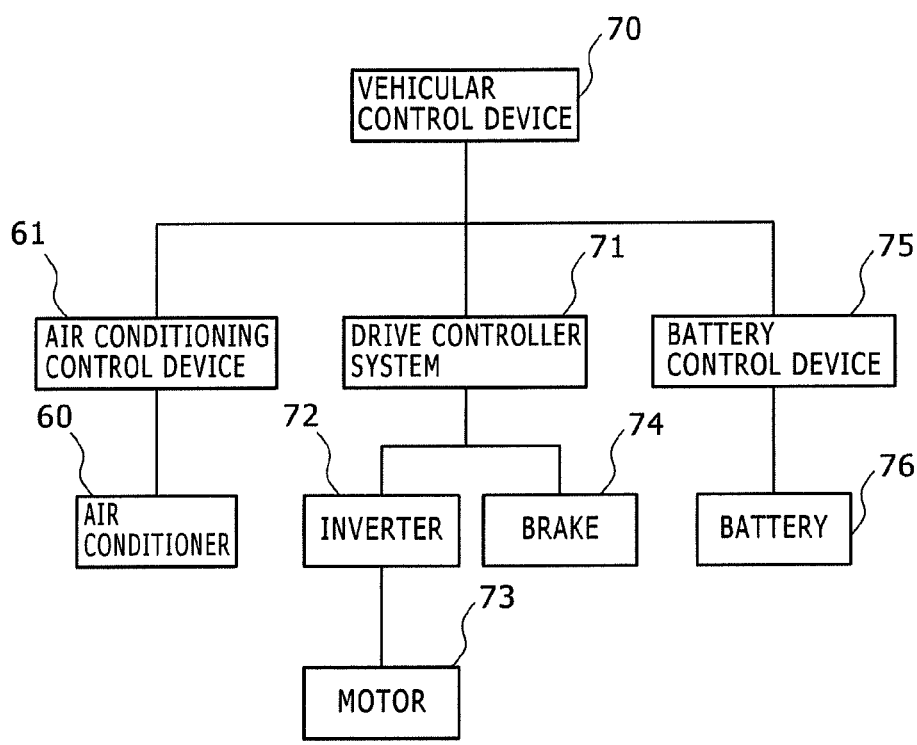
FIG. 22 is a block diagram showing the structure of the control device for electric cars mounted with the vehicular air conditioning system of the present invention.

Next, the structure of the control device for the electric car in which the vehicular air conditioning system of the present invention is installed is described while referring to FIG. 22. The control device for electric cars is comprised of a vehicular control device 70 to control the entire vehicle, an air conditioning control device 61 to control the air conditioner 60, a drive controller device 71 to control driving of a motor 73, an inverter 72, and the brake 74, and a battery control device 75 to manage the power of the battery 76. There are other control devices than described above but those control devices are omitted from the present embodiment.

The air conditioning control device 61 controls the switching operation in the air conditioner 60 described above in FIG. 3 through FIG. 11 and regulates the temperature of the machine coolant and the air conditioning coolant shown in FIG. 20. The air conditioning control device 61 is integrated into a single unit with the air conditioner 60 or made a structure integrated with a section of the air conditioner 60 then the mounting capability of this equipment into the vehicle can be improved.

Moreover, forming at least one among the vehicular control device 70, the drive controller device 71, and the battery control device 75 into an integrated structure with the air conditioning control device 61 will allow eliminating wiring between control devices and clamping hardware for installation in the vehicle.

In the following embodiment a heater is installed instead of the indoor cooling heat exchanger 6B shown in the above described embodiment.

(20) Air Conditioner Structure

Figure 23:
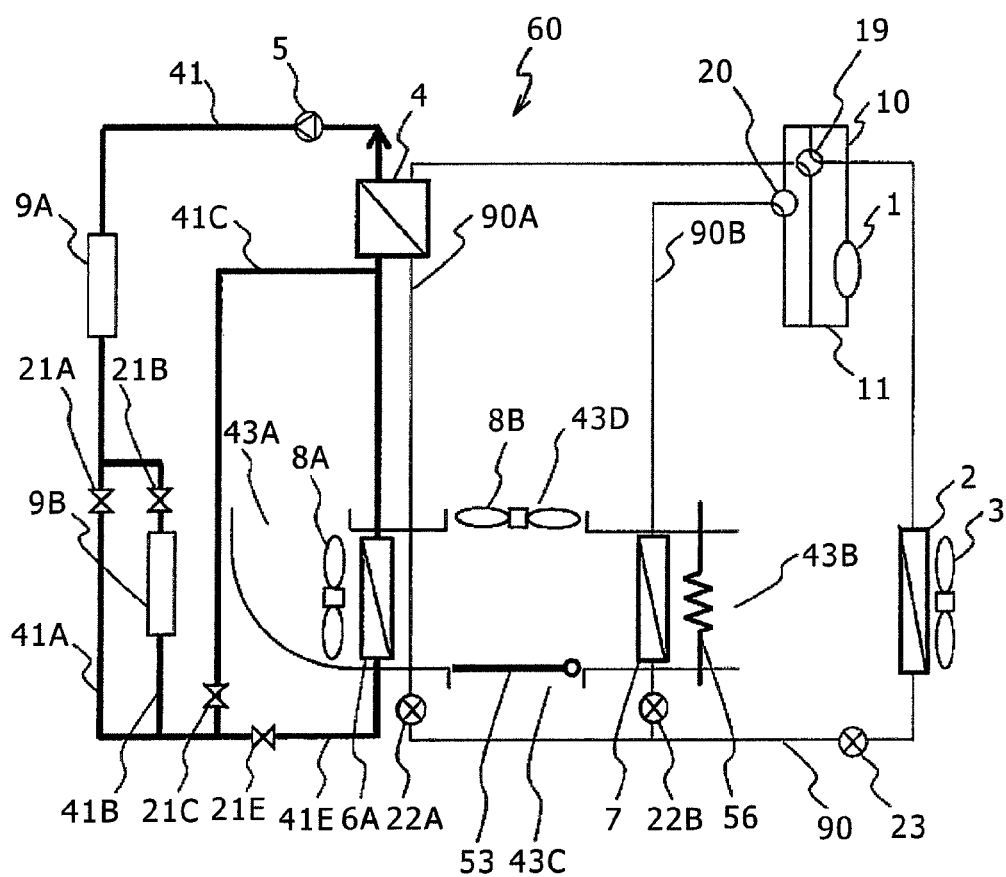
FIG. 23 is a drawing showing the overall structure of the vehicular air conditioning system of the second embodiment of the present invention.

FIG. 23 is a drawing showing the overall structure of the air conditioner 60 of another embodiment of the present invention. The air conditioner 60 includes a refrigeration cycle circuit 90 for circulating the air conditioning coolant (e.g. refrigerant) to cool the heating element 9 and for indoor air conditioning the same as for the air conditioner shown in FIG. 2; and a machine coolant circuit 41 to circulate the machine coolant (e.g. cooling water) for cooling the heating element 9.

A compressor 1 to compress the coolant, an outdoor heat exchanger 2 to carry out heat exchange between the air conditioning coolant and the outside air, an intermediate heat exchanger 4 within the branching refrigerating cycle circuit 90A to carry out heat exchange between the air conditioning coolant and the machine coolant flowing within the machine coolant circuit 41; and an indoor air conditioning heat exchanger 7 within the refrigerating cycle circuit 90B to carry out heat exchange between the air conditioning coolant and the vehicle interior air are connected to the refrigerating cycle circuit 90 by way of a fluid pipe for circulating the air conditioning coolant.

A four-way valve 19 is installed between the intake pipe 11 and the dispensing pipe 10 of the compressor 1. Switching the four-way valve 19 allows connecting either of the intake pipe 11 and dispensing pipe 10 to the outdoor heat exchanger 2, and connecting the other to the intermediate heat exchanger 4 and the indoor air conditioning heat exchanger 7. The four-way valve 19 shown in FIG. 23, connects the dispensing pipe 10 to the outdoor heat exchanger 2, and connects the dispensing pipe 11 to the intermediate heat exchanger 4.

One end of the indoor air conditioning heat exchanger 7 is connected to the outdoor heat exchanger 2, and the other end is connected by way of the three-way valve 20 to allow switching to either of the intake pipe 11 or the dispensing pipe 10 of the compressor 1. The expansion valves 23, 22A, 22B functioning as the flow rate control method for the air conditioning coolant are respectively mounted on the side not connected to the compressor 1 of the outdoor heat exchanger 2, between the intermediate heat exchanger 4 and the outdoor heat exchanger 2, and between the indoor air conditioning heat exchanger 7 and the outdoor heat exchanger 2. The outdoor heat exchanger 2 contains an outside air fan 3 for blowing outside air.

The machine coolant circuit 41 is connected in sequence in a ring-shaped layout to an indoor cooling heat exchanger 6A to perform heat exchange between the vehicle interior air flow and the machine coolant, the intermediate heat exchanger 4, the pump 5 to circulate the machine coolant within the machine coolant circuit 41, and the heating element 9 as the device requiring temperature adjustment.

A bypass circuit 41C functioning as a bypass on both ends of the indoor coolant exchanger 6A is mounted in the machine coolant circuit 41. A two-way valve 21C is mounted along the bypass circuit 41C, a two-way valve 21E is mounted on the circuit 41E passing through the indoor cooling heat exchanger 6A. The opening and closing action of these two-way valves 21C, 21E allows switching the flow paths for the machine coolant. Moreover, the two-way valves are connected as shown in FIG. 23 in the machine coolant circuit 41 in order to regulate the temperature of the plural heating elements 9A, 9B. A two-way valve 21B is installed in the machine coolant circuit 41B containing the heating element 9B, and a two-way valve 21A is installed in the machine coolant circuit 41A not passing through the heating element 9B. The temperature of both the heating elements 9A, 9B can in this way be regulated when the two-way valve 21A is closed and the two-way valve 21B is opened. However only the temperature of the heating element 9A can be regulated when the two-way valve 21A is opened and the two-way valve 2B is closed. Plural heating elements 9 may even be connected in series at the heating element 9A position. The method for connecting the heating elements 9, and the method for installing the two-way valves can be changed according to the heating element temperature conditions.

To provide indoor air conditioning, the indoor unit 42 blowing the temperature-regulated air contains the indoor fans 8A, 8B to suction indoor (in-vehicle) or outdoor (outside the vehicle) air, and blow the air to inside the vehicle or outside the vehicle, an indoor coolant heat exchanger 6A, the indoor air conditioning heat exchanger 7, the switching damper 53 to blow the air that was heat-exchanged in the indoor cooling heat exchanger 6A to inside the vehicle or outside the vehicle, a heater 56 to warm the air that was heat-exchanged by the indoor air conditioning heat exchanger 7, and the air in/out ports 43A, 43B, 43C, 43D to suction the vehicle inside or vehicle outside air, or blow air to inside the vehicle or outside the vehicle.

The heater 56 is an electrical heater, and is switched on or off by applying or cutting off the electrical power.

The operation of the air conditioner 60 shown in FIG. 23 is described next. In the present embodiment, the temperature of the heating element 9 is adjusted by the pump circulating the machine coolant. The operation of the other machines varies according to the heat amount emitted from the air conditioning load and the heating element 9. In the following description, the machine cooling, cooling air conditioning, cooling air conditioning+machine cooling, heating air conditioning, heating air conditioning+machine cooling, dehumidifying, machine heating, and defrosting operation are described.

(21) Machine Cooling Operation

Figure 24:
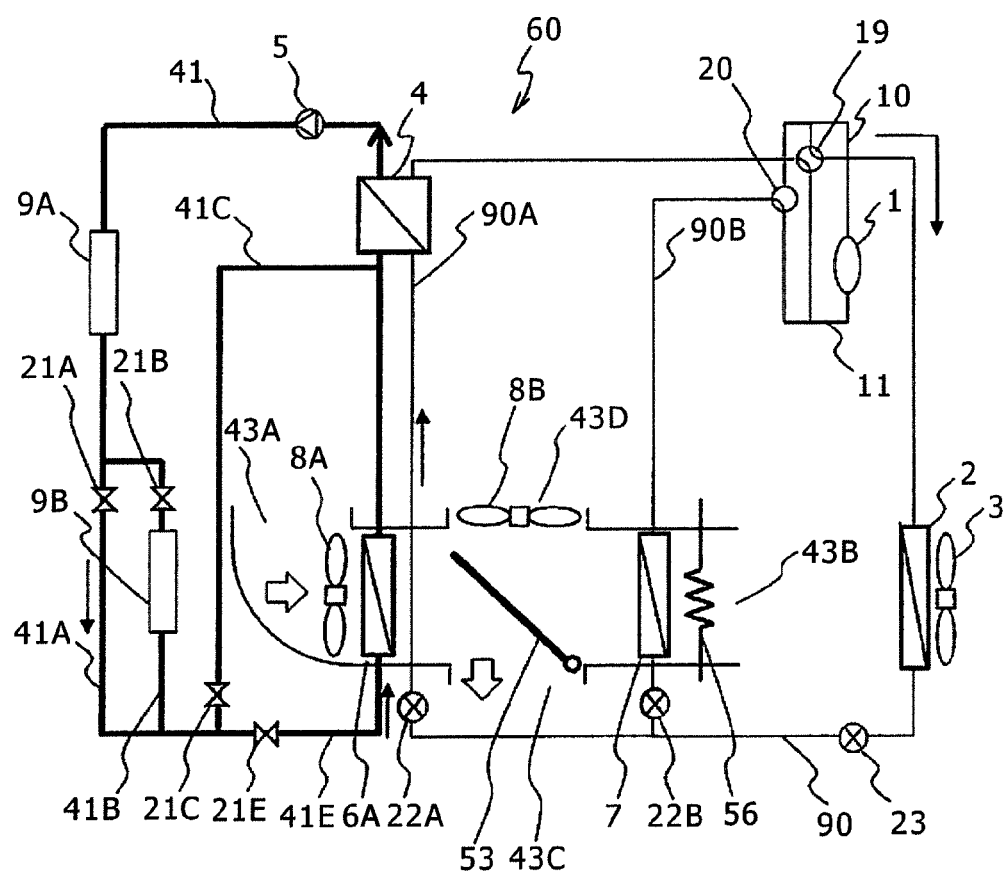
FIG. 24 is a drawing showing the overall structure of the air conditioner 60 of the second embodiment in the mode for machine cooling operation.

Machine cooling operation is the operation to cool the heating element 9 in a state where there is no vehicle indoor air conditioning and is described while referring to FIG. 24. This operation is utilized when the indoor cooling heat exchanger 6A is only cooling the machine coolant circulating in the machine coolant circuit 41; and when the indoor cooling heat exchanger 6A and intermediate heat exchanger 4 are cooling the machine coolant.

Closing the two-way valve 21C and opening the two-way valve 21E in the machine coolant circuit 41 causes the machine coolant driven by the pump 5 to circulate in the indoor cooling heat exchanger 6A and the intermediate heat exchanger 4. Machine coolant flows in the machine coolant circuit 41A when the two-way valve 21B is closed, and the two-way valve 21A is opened. Machine coolant flows in the machine coolant circuit 41B when the two-way valve 21A is closed and the two-way valve 21B is opened. If cooling both the heating elements 9A, 9B, the two-way valve 21A is closed and the two-way valve 21B is opened.

As shown in FIG. 24, the switching damper 53 within the indoor unit 42 is set so that the air suctioned into by the air in/out port 43A passes through the indoor cooling heat exchanger 6A and is blown from the air in/out port 43C. The passage of air through this indoor cooling heat exchanger 6A cools the machine coolant. The cooling capability can moreover be adjusted by way of the air flow suctioned in by the indoor fan 8A. The air in/out port 43C is configured by way of a duct not shown in the figure so as not to blow warm air into the vehicle.

When the intermediate heat exchanger 4 is cooling the machine coolant, the four-way valve 19 and the three-way valve 20 are connected as shown in FIG. 24, and the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. The expansion valve 22B is fully closed so that no air conditioning coolant flows into the indoor air conditioning heat exchanger 7. The outdoor heat exchanger 2 in other words serves as a condenser and the intermediate heat exchanger 4 serves as an evaporator.

After the air conditioning coolant compressed by the compressor 1 is liquefied by the heat radiating from the outdoor heat exchanger 2, the air conditioning coolant passes through the fully opened expansion valve 23 and flows into the intermediate heat exchanger 4. The air conditioning coolant flowing into the intermediate heat exchanger 4 is depressurized by the expansion valve 22A and reaches a low temperature, low pressure state, and the machine coolant in the machine coolant circuit 41 evaporates from the absorption of heat in the intermediate heat exchanger 4, and returns by way of the four-way valve 19 to the compressor 1. Heat exchange between the machine coolant and the air conditioning coolant takes place in the intermediate heat exchanger 4 by utilizing the refrigeration cycle circuit 90 to cool the machine coolant.

The machine coolant can in this way be cooled by the indoor cooling heat exchanger 6A and the intermediate heat exchanger 4. When the machine coolant is a lower temperature than the specified temperature, the machine coolant is cooled only in the indoor cooling heat exchanger 6A without utilizing the refrigeration cycle circuit 90, and when the machine coolant is a higher temperature than the specified temperature, the machine coolant is cooled in the intermediate heat exchanger 4 and the indoor cooling heat exchanger 6A by utilizing the refrigeration cycle circuit 90.

The temperature of the machine coolant can be regulated by controlling the air flow of the indoor fan 8A, the flow rate of the pump 5, the rotation speed of the compressor 1, the degree of opening of the expansion valve 22A, and the flow rate of the outdoor fan 3. If the machine coolant is a higher temperature, the air flow of the indoor fan 8A may be increased, the flow rate of the pump 5 may be increased, the rotation speed of the compressor 1 may be increased, the degree of opening of the expansion valve 22A may be widened, and the air flow of the outdoor fan 3 may be increased. On the other hand, if the machine coolant is a lower temperature, the air flow of the indoor fan 8A may be decreased, the flow rate of the pump 5 may be decreased, the rotation speed of the compressor 1 may be decreased, the degree of opening of the expansion valve 22A be narrowed, and the air flow of the outdoor fan 3 may be decreased. Not all of the actuators need be controlled, and just controlling at least one actuator is sufficient.

(22) Cooling Air Conditioning Operation

The cooling air conditioning operation is an operation that cools the interior of the vehicle without cooling the heating element 9. The cooling air conditioning operation is described next while referring to FIG. 25.

The machine coolant circuit 41 causes the pump 5 to drive the machine coolant to flow in the machine coolant circuit 41C without flowing through the indoor cooling heat exchanger 6A, by closing the two-way valve 21E and opening the two-valve 21C. In this way, an uneven temperature rise in the machine coolant in the heating element 9 section is prevented by circulating the machine coolant in the machine coolant circuit 41 even if there is no cooling of the heating element 9. If the two-way valve 21A is opened and the two-way valve 21B is closed, the machine coolant flows into the machine coolant circuit 41A, and if the two-way valve 21A is closed and the two-way valve 21B is opened, the machine coolant flows into the machine coolant circuit 41B.

The switching damper 53 within the indoor unit 42 is set as shown in FIG. 24 so that the air suctioned in by the air in/out port 43A passes through the indoor cooling heat exchanger 6A and the indoor air conditioning heat exchanger 7, and is blown out from the air in/out port 43B. No machine coolant circulates in the indoor cooling heat exchanger 6A so that there are no temperature fluctuations in the air passing through the indoor cooling heat exchangers 6A. The air in/out port 43B is connected by a duct not shown in the drawing to regulates the indoor (vehicle interior) temperature.

Figure 25:
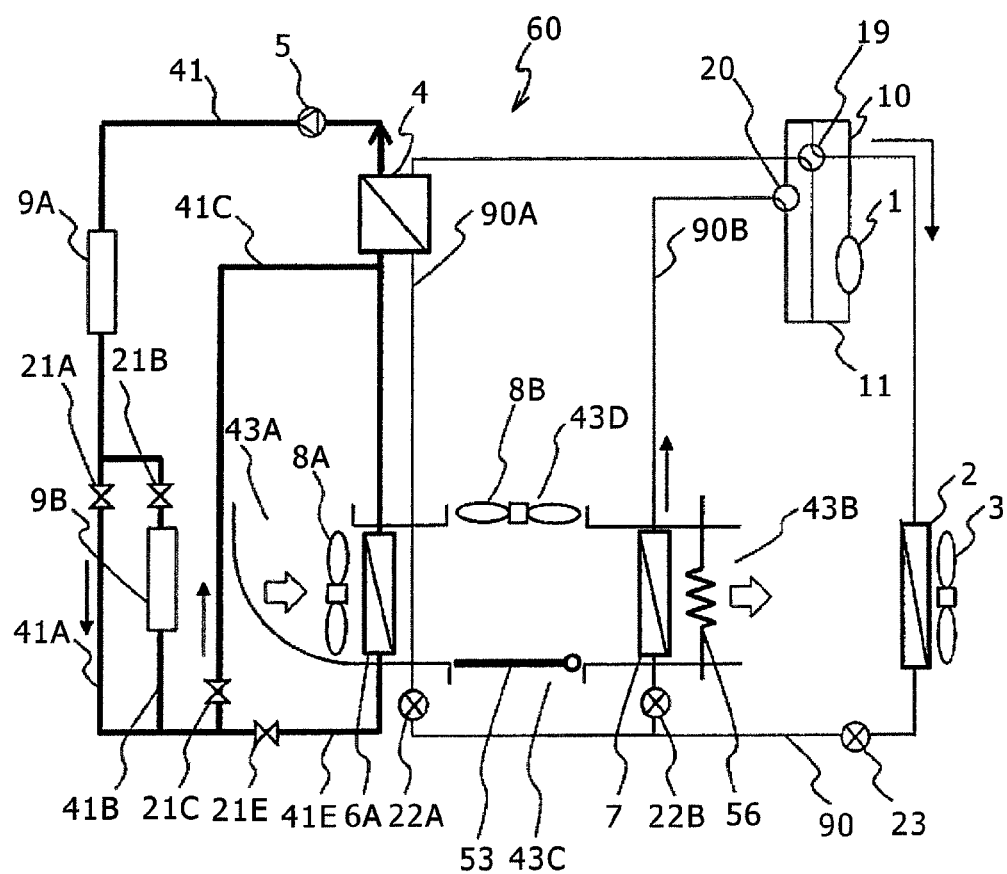
FIG. 25 is a drawing showing the overall structure of the air conditioner 60 of the second embodiment in the mode for cooling air conditioning operation.

In this cooling air conditioning operation, the four-way valve 19 and the three-way valve 20 are connected as shown in FIG. 25, the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. The expansion valve 22A is fully closed so that no air conditioning coolant flows into the intermediate heat exchanger 4. In other words, the outdoor heat exchanger 2 serves as a condenser and the indoor air conditioning heat exchanger 7 serves as an evaporator.

After the air conditioning coolant compressed by the compressor 1 is liquefied by the heat discharge in the outdoor heat exchanger 2, the air conditioning coolant passes through the fully opened expansion valve 23 and flows into the indoor air conditioning heat exchanger 7. The air conditioning coolant flowing into the indoor air conditioning heat exchanger 7 is depressurized by the expansion valve 22B and reaches a low temperature, low pressure state, and evaporates due to the absorption of heat from the air suctioned in by the air in/out port 43B in the indoor air conditioning heat exchanger 7, and returns by way of the three-way valve 20 to the compressor 1. The air cooled in this way by heat exchange in the indoor air conditioning heat exchanger 7 is blown from the air in/out port 43B to the interior of the vehicle.

The air flow of the internal fan 8A, the rotation speed of the compressor 1, the degree of opening of the expansion valve 22B, the air flow of the outdoor fan 3 may be regulated in order to adjust the temperature of the air blown from the air in/out port 43B. If the blown air is a higher temperature than the target temperature, the air flow of the indoor fan 8A may be increased, the rotation speed of the compressor 1 may be increased, the degree of opening of the expansion valve 22B may be widened, and the air flow of the indoor fan 3 may be increased. On the other hand, if the air blow is a lower temperature than the target temperature, the air flow of the indoor fan 8A may be decreased, the rotation speed of the compressor 1 may be decreased, the degree of opening of the expansion valve 22B may be narrowed, and the air flow of the outdoor fan 3 may be decreased. Not all of the actuators need be controlled, and just controlling at least one actuator is sufficient.

(23) Cooling Air Conditioning and Machine Cooling Operation

Figure 26:
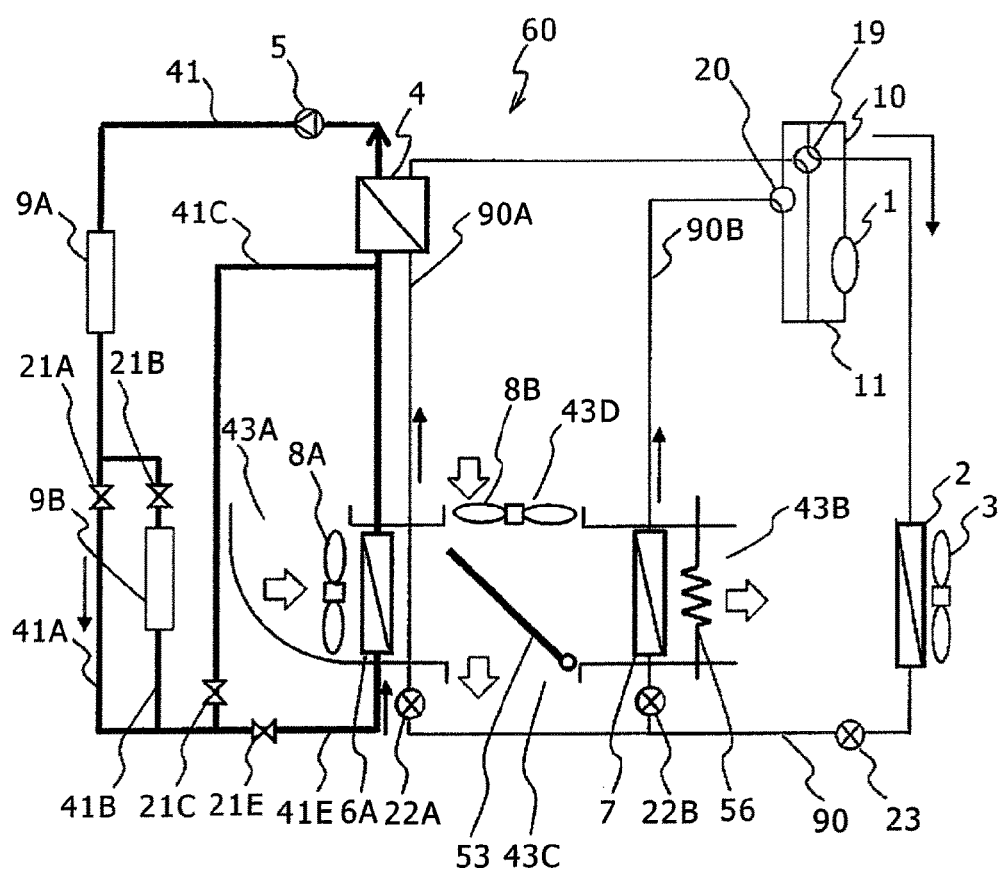
FIG. 26 is a drawing showing the overall structure of the air conditioner 60 of the second embodiment in the mode for the cooling air conditioning and machine cooling operation.

The cooling air conditioning and machine cooling is an operation to cool the heating element 9 and to cool air condition the vehicle interior, and is described while referring to FIG. 26. This operation includes the case where cooling the machine coolant circulating in the machine coolant circuit 41 just by using the indoor cooling heat exchanger 6A, and the case where cooling the machine coolant by using the indoor cooling heat exchanger 6A and the intermediate heat exchanger 4.

The machine coolant circuit 41 is rendered to circulate machine coolant driven by the pump 5 in the indoor cooling heat exchanger 6A and the intermediate heat exchanger 4 by closing the two-way valve 21C and opening the two-way valve 21E. If the two-way valve 21A is open, and the two-way valve 21B is closed, machine coolant flows in the machine coolant circuit 41A, and if the two-way valve 21A is closed and the two-way valve 21B is opened then machine coolant flows in the machine coolant circuit 41B. If cooling both the heating elements 9A and 9B, the two-way valve 21A is closed, and the two-way valve 21B is opened.

The switching damper 53 within the indoor unit 42 is set as shown in FIG. 26, so that the air suctioned in by the air in/out port 43A passes through the indoor cooling heat exchanger 6A and is blown from the air in/out port 43C. The air in/out port 43C is rendered not to blow air inside the vehicle by way of a duct not shown in the drawing. Moreover the air suctioned in from the air in/out port 43D by the indoor fan 8B passes through the indoor air conditioning heat exchanger 7 and is blown from the air in/out port 43B.

The passage of air through the indoor cooling heat exchanger 6A can cool the machine coolant. The air passing through the indoor air conditioning heat exchanger 7 is cooled by the indoor air conditioning heat exchanger 7 and that cooled air is blown inside (inside the vehicle).

In this cooling air conditioning and machine cooling operation, the four-way valve 19 and the three-way valve 20 are connected as shown in FIG. 26, the dispensing pipe 10 of the compressor 1 is connected to the outdoor heat exchanger 2, and the intake pipe 11 of the compressor 1 is connected to the intermediate heat exchanger 4 and the indoor air conditioning heat exchanger 7. Namely, the outdoor heat exchanger 2 serves as a condenser and the intermediate heat exchanger 4 and the indoor air conditioning heat exchanger 7 serve as evaporators.

After the air conditioning coolant compressed by the compressor 1, is liquefied by the heat discharge from the outdoor heat exchanger 2, the air conditioning coolant passes through the fully opened expansion valve 23 and flows into the intermediate heat exchanger 4 and the indoor air conditioning heat exchanger 7. The air conditioning coolant flowing into the intermediate heat exchanger 4 is depressurized by the expansion valve 22A and reaches a low temperature, low pressure state, and evaporates due to the absorption of heat from the machine coolant in the machine coolant circuit 41 in the intermediate heat exchanger 4, and returns to the compressor 1 by way of the four-way valve 19. Heat exchange between the machine coolant and air conditioning coolant takes place in this way in the intermediate heat exchanger 4 and cools the machine coolant. The air conditioning coolant flowing into the indoor air conditioning heat exchanger 7, is depressurized by the expansion valve 22B, reaches a low temperature, low pressure state, evaporates due to absorption of heat from the air suctioned from the air in/out port 43D in the indoor air conditioning heat exchanger 7, and returns to the compressor by way of the three-way valve 20. The air that was heat-exchanged and cooled by the indoor air conditioning heat exchanger 7 in this way is blown to inside the vehicle from the air in/out port 43B.

As shown above, the cooling air conditioning of the vehicle interior and the cooling of the heating element 9 can both be achieved at the same time by utilizing both the intermediate heat exchanger 4 and the indoor air conditioning heat exchanger 7 as an evaporator. The intermediate heat exchanger 4 and the indoor air conditioning heat exchanger 7 are moreover connected in parallel with the intake pipe 11 of compressor 1, and the expansion valves 22A, 22B are mounted on the refrigerating cycle circuit 90A, 90B so that the flow rates of air conditioning coolant flowing to the intermediate heat exchanger 4 and the indoor air conditioning heat exchanger 7 can each be varied as needed. The temperature of the machine coolant and the temperature of the air conditioning coolant can consequently be regulated to their respective desired temperatures. The temperature of machine coolant flowing inside the heating element 9 can therefore be maintained at a high temperature by suppressing the flow rate of coolant flowing into the intermediate heat exchanger 4, even when the temperature of the air conditioning coolant was sufficiently lowered in order to carry out cooling air conditioning.

The indoor cooling heat exchanger 6A and intermediate heat exchanger 4 can cool the machine coolant as described above. If the machine coolant is a lower temperature than the specified temperature, the machine coolant is cooled only in the indoor cooling heat exchanger 6A without utilizing the refrigerating cycle circuit 90; and if the machine coolant is a higher temperature than a specified temperature the machine coolant is cooled by the indoor cooling heat exchanger 6A and intermediate heat exchanger 4 utilizing the refrigerating cycle circuit 90. This regulation is implemented by control to adjust the degree of opening of the expansion valve 22A. If the expansion valve 22A is fully closed then the air conditioning coolant does not flow to the intermediate heat exchanger 4 so that only the indoor cooling heat exchanger 6A cools the machine coolant.

The air flow of the indoor fans 8A, 8B, the flow rate of the pump 5, the rotation speed of the compressor 1, the degree of opening of the expansion valves 22A, 22B, and air flow of the outdoor fan 3 may be regulated in order to control the machine coolant temperature and the temperature of the air blown from the air in/out ports 43B. If the machine coolant is a higher temperature than the target temperature or the air that is blown is a higher temperature than the target temperature, the air blow of the indoor fans 8A, 8B may be increased, the flow rate of the pump 5 may be increased, the rotation speed of the compressor 1 may be increased, the degree of opening of expansion valves 22A, 22B may be widened, and the air flow of the outdoor fan 3 may be increased. On the other hand, if the machine coolant is a lower temperature than the target temperature or the blown air is a lower temperature than the target temperature, the air flow of the indoor fans 8A, 8B may be decreased, the flow rate of the pump 5 may be decreased, the rotation speed of compressor 1 may be decreased, the degree of opening of expansion valves 22A, 22B may be narrowed, and the air flow of the outdoor fan 3 may be decreased. Not all of the actuators need be regulated, and regulating at least one of the actuators is sufficient.

(24) Heating Air Conditioning Operation

Figure 27:
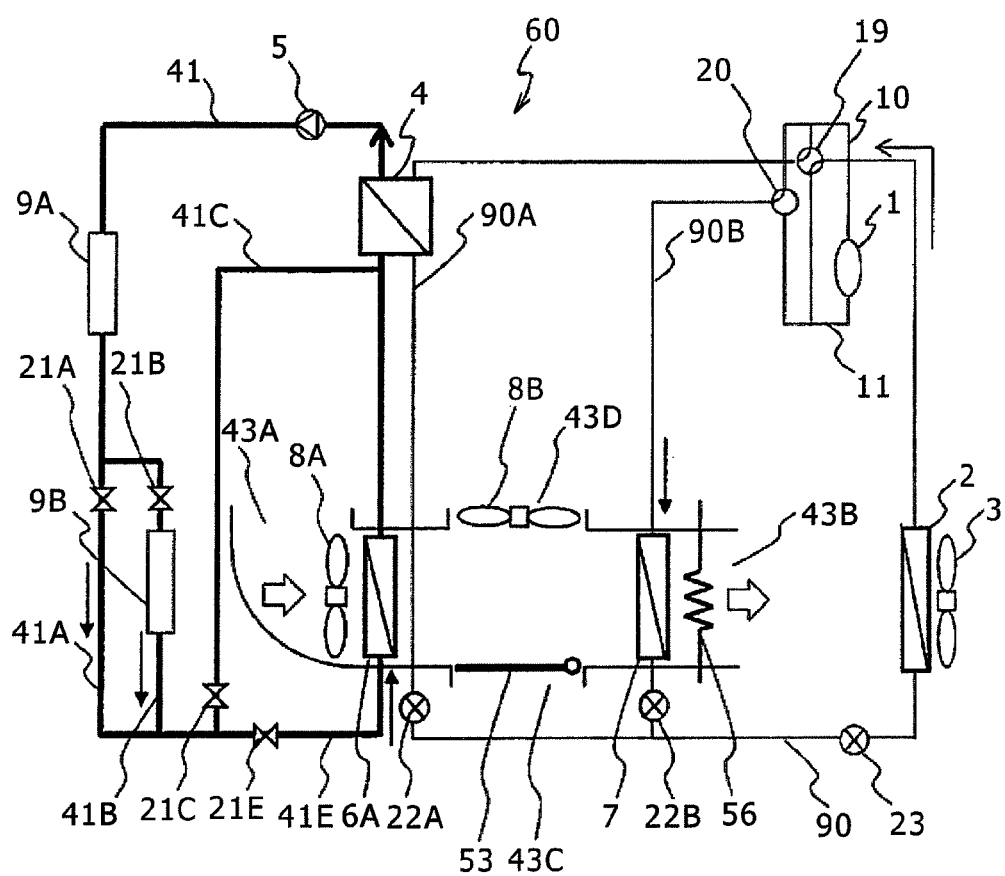
FIG. 27 is a drawing showing the overall structure of the air conditioner 60 of the second embodiment in the mode for the heating air conditioning operation.

Heating air conditioning is an operation to warm the interior air of the vehicle without cooling the heating element 9 and is described while referring to FIG. 27.

The machine coolant circuit 41 allows machine coolant driven by the pump 5 to flow in the indoor cooling heat exchanger 6A and the intermediate heat exchanger 4 by opening the two-way valve 21E and closing the two-way valves 21C. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B.

The switching damper 53 within the indoor unit 42 are set as shown in FIG. 27 so that the air suctioned in by the air in/out port 43A passes through the indoor cooling heat exchanger 6A and the indoor air conditioning heat exchanger 7 and is blown out from the air in/out port 43B. Machine coolant warmed by the heating element 9 circulates in this indoor cooling heat exchanger 6A so that the temperature of the air passing through the indoor cooling heat exchanger 6A rises. The air in/out port 43B connects to the interior (inside of vehicle) and regulates the interior temperature.

If the heating load is small, the waste heat from the heating element 9 can be utilized for heating air conditioning as described above so that the refrigeration cycle circuit 90 is not used for heating air conditioning. Utilizing this waste heat allows air conditioning that cuts energy consumption. Closing the two-way valve 21A, and opening the two-way valve 21B allows the machine coolant flow in the machine coolant circuit 41B and utilizing the waste heat from the heating element 9B for heating air conditioning and so can suppress energy consumption even further.

If the waste heat from the heating elements 9A, 9B alone is not sufficient to handle the heating load, the refrigerating cycle circuit 90 can be jointly added to the waste heat from the heating elements 9A, 9B. In that case, the four-way valve 19 and the three-way valve 20 are connected as shown in FIG. 27, the dispensing pipe 10 of compressor 1 is connected to the intermediate heat exchanger 4 and the indoor air conditioning heat exchanger 7, and the intake pipe 11 is connected to the outdoor heat exchanger 2. The expansion valve 22A is fully closed, the expansion valve 22B is fully opened, so that no air conditioning coolant flows in the intermediate heat exchanger 4 and flows only in the indoor air conditioning heat exchanger 7. In other words, the indoor air conditioning heat exchanger 7 serves as a condenser, and the outdoor heat exchanger 2 serves as an evaporator.

The air conditioning coolant compressed by the compressor 1 is condensed and liquefied by heat discharge in the indoor air conditioning heat exchanger 7. Next, after depressurization in the expansion valve 23, the air conditioning coolant is evaporated and gasified by heat exchange with the vehicle outside air in the outdoor heat exchanger 2 and returned to the compressor 1.

The air suctioned in by the air in/out port 43A as described above, is heated in the indoor cooling heat exchanger 6A by the machine coolant flowing in the machine coolant circuit 41. Also, the air further heated by heat exchange in the indoor air conditioning heat exchanger 7 mounted on the downstream side is blown from the air in/out port 43B to the inside of the vehicle. The air blown to the inside in this way is therefore further heated in the refrigerating cycle circuit 90 after being heated by waste heat from the heating element 9. The heating of the air by utilizing this refrigerating cycle circuit 90 supplements the heated air temperature that might not be fully heated by waste heat from the heating element 9 to attain an air conditioning device having minimal energy consumption.

If performance is still insufficient even after using the refrigerating cycle circuit 90 to heat the air, then the air blown from the air in/out port 43B can be further heated by turning the heater 56 on.

In order to regulate the temperature of the air blown from the air in/out port 43B, the air flow of the indoor fan 8A, the flow rate of the pump 5, the degree of opening of the expansion valve 22B, and the air flow of the outdoor fan 3 may be regulated. If the blown air is a lower temperature than the target temperature, the air flow of the indoor fan 8A may be increased, the flow rate of the pump 5 may be increased, the rotation speed of the compressor 1 may be increased, the degree of opening of the expansion valve 22B may be widened, and the air flow of the indoor fan may be increased. On the other hand, if the blown air is a higher temperature than the target temperature, the air flow of the indoor fan 8A may be decreased, the flow rate of the pump 5 may be decreased, the rotation speed of the compressor 1 may be decreased, the degree of opening of the expansion valve 22B may be narrowed, and the air flow of the outdoor fan 3 may be decreased. Not all of the actuators need be regulated, and regulating at least one of the actuators is sufficient.

(25) Heating Air Conditioning and Machine Cooling Operation

Figure 28:
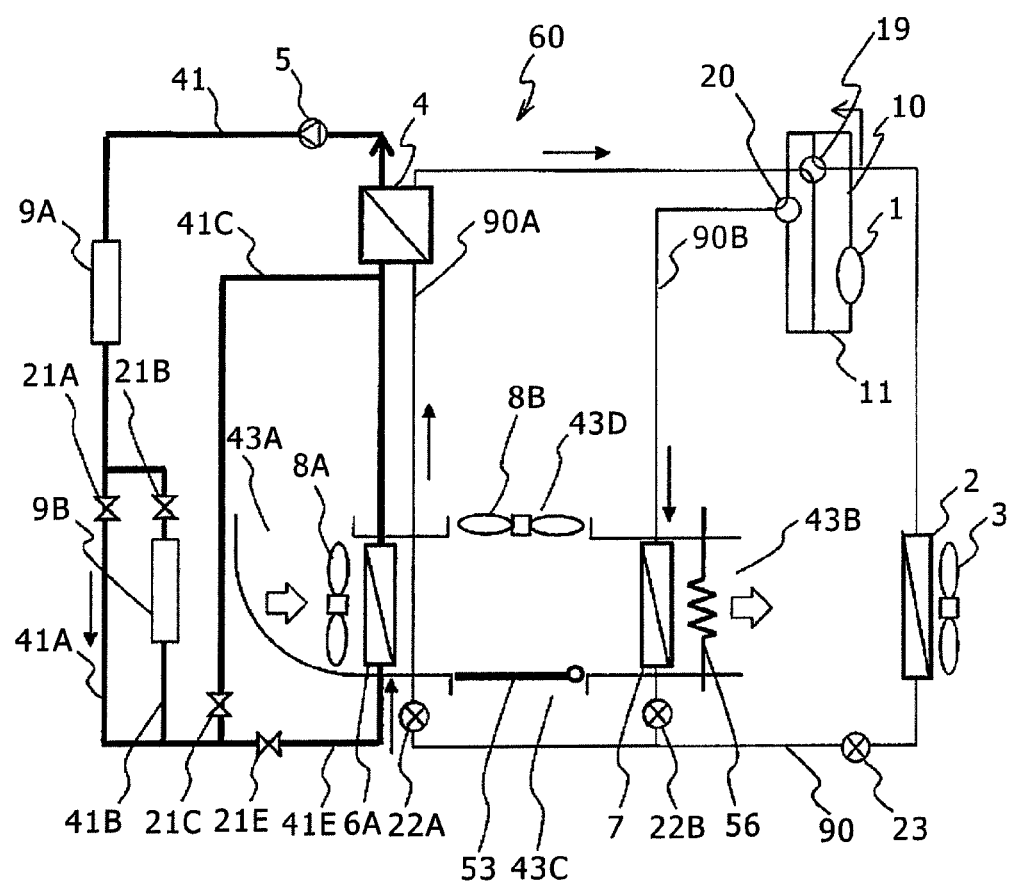
FIG. 28 is a drawing showing the overall structure of the air conditioner 60 of the second embodiment in the mode for the heating air conditioning and machine cooling operation.

The heating air conditioning and machine cooling operation is an operation to cool the heating element 9 and heat the interior of the vehicle, and is described while referring to FIG. 28. If the machine coolant can be maintained at the target temperature or below by heat discharge from the indoor cooling heat exchanger 6A as was described above in the heating air conditioning operation then a temperature rise in the heating element 9 can be prevented. However, if the heat discharged from the indoor cooling heat exchanger 6A is inadequate or if temporarily lowering the temperature of the machine coolant as described later on then heating of the machine coolant by utilizing the refrigerating cycle circuit 90 is required.

In this heating air conditioning and machine cooling operation, the four-way valve 19 and the three-way valve 20 are connected as shown in FIG. 28, the dispensing pipe 10 of compressor 1 connects to the indoor heat exchanger 2 and the indoor air conditioning heat exchanger 7, and the intake pipe 11 connects to the intermediate heat exchanger 4. The expansion valve 23 is fully closed, and the expansion valve 22B fully opened to prevent the air conditioning coolant from flowing into the outdoor heat exchanger 2. Namely, the indoor air conditioning heat exchanger 7 functions as a condenser and the intermediate heat exchanger 4 functions as an evaporator.

The air conditioning coolant compressed by the compressor 1 is condensed and liquefied by the heat discharged in the indoor air conditioning heat exchanger 7. Next, after depressurization in the expansion valve 22A, the air conditioning coolant is evaporated and gasified by heat exchange with the machine coolant flowing in the machine coolant circuit 41 in the intermediate heat exchanger 4, and returned to the compressor 1. Heat exchange between the machine coolant and the air conditioning coolant take place in the intermediate heat exchanger 4, which cools the machine coolant.

The machine coolant circuit 41 allows machine coolant driven by the pump 5 to flow in the indoor cooling heat exchanger 6A and the intermediate heat exchanger 4 by opening the two-way valve 21E, and closing the two-way valve 21C. If the two-way valve 21A is opened, and the two-way valve 21B is closed, the machine coolant flows into the machine coolant circuit 41A; and if the two-way valve 21A is closed and the two-way valve 21B is opened then the machine coolant flows in the machine coolant circuit 41B.

The switching damper 53 within the indoor unit 42 is set as shown in FIG. 28, so that the air suctioned in by the air in/out port 43A passes through the indoor cooling heat exchanger 6A and the indoor air conditioning heat exchanger 7 and is blown from the air in/out port 43B. The machine coolant heated by the heating element 9 is circulated in this indoor cooling heat exchanger 6A, so that the temperature of the air passing through the indoor cooling heat exchanger 6A rises.

The air further heated by the heat exchange in the indoor air conditioning heat exchanger 7 mounted downstream is blown to inside the vehicle from the air in/out port 43B. The air blown to the inside in this way is therefore further heated by the refrigerating cycle circuit 90 after being heated by waste heat from the heating element 9. The air in/out port 43B connects to the inside (vehicle interior) by way of a duct not shown in the drawing, to regulate the inside temperature.

The machine coolant can be cooled by heat discharge from the indoor cooling heat exchanger 6A and heat exchange by the intermediate heat exchanger 4. The air flow of the indoor fan 8A, the flow rate in the pump 5, the rotation speed of the compressor 1, and the degree of opening of the expansion valve 22A may be regulated to control the temperature of the air blown from the air in/out port 43B and the temperature of the machine coolant. If the machine coolant is a higher temperature than the target temperature or the blown air is a lower temperature than the target temperature, the air flow of the indoor fan 8A may be increased, the flow rate of the pump 5 may be increased, the rotation speed of the compressor 1 may be increased, and the degree of opening of the expansion valve 22A may be widened. On the other hand, if the coolant is a lower temperature than the target temperature, or the blown air is a higher temperature than the target temperature, the air flow of the indoor fan 8A may be decreased, the flow rate of the pump 5 may be decreased, the rotation speed of the compressor 1 may be decreased, and the degree of opening of the expansion valve 22A may be narrowed. Not all of the actuators need be regulated, and regulating at least one of the actuators is sufficient.

(26) Dehumidifying Operation

Figure 29:
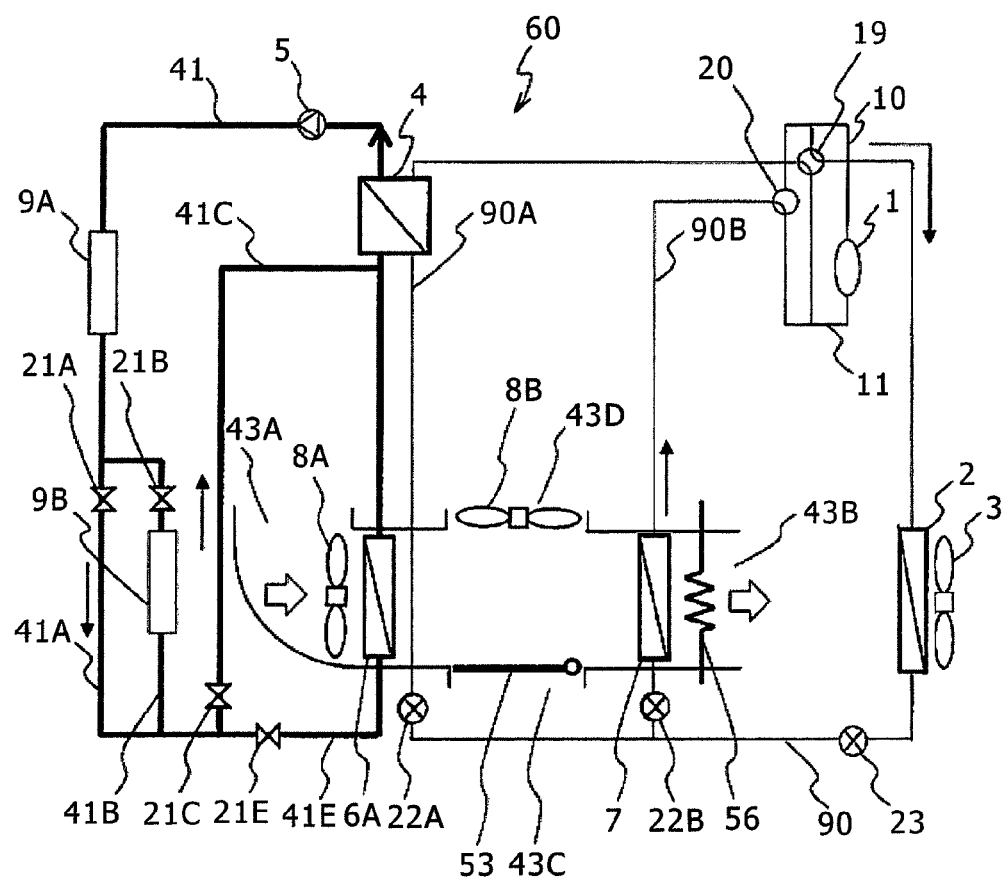
FIG. 29 is a drawing showing the overall structure of the air conditioner 60 of the second embodiment in the mode for the dehumidifying operation.

The dehumidifying operation is an operation to remove the humidity from the interior and is described while referring to FIG. 29.

In the dehumidifying operation, the four-way valve 19 and the three-way valve 20 are connected as shown in FIG. 29, the dispensing pipe 10 of the compressor 1 connects to the outdoor heat exchanger 2, and the intake pipe 11 of the compressor 1 connects to the intermediate heat exchanger 4 and the indoor air conditioning heat exchanger 7. Fully closing the expansion valve 22A and fully opening the expansion valve 23 prevents the air conditioning coolant from flowing in the intermediate heat exchanger 4. In other words, the outdoor heat exchanger 2 functions as a condenser, and the indoor air conditioning heat exchanger 7 functions as an evaporator.

After the air conditioning coolant compressed by the compressor 1, is liquefied by heat discharge by the outdoor heat exchanger 2, the air conditioning coolant passes through the fully open expansion valve 23 and flows into the indoor air conditioning heat exchanger 7. The air conditioning coolant flowing into the indoor air conditioning heat exchanger 7 is depressurized by the expansion valve 22B and reaches a low temperature, low pressure state, and evaporates due to the absorption of heat from the air suctioned in by the air in/out port 43A in the indoor air conditioning heat exchanger 7, and returns to the compressor 1 by way of the three-way valve 20.

The machine coolant circuit 41 allows machine coolant driven by the pump 5 to flow in the intermediate heat exchanger 4 by opening the two-way valve 21C, and closing the two-way valve 21E. If the two-way valve 21A is opened and the two-way valve 21B is closed then machine coolant flows in the machine coolant circuit 41A; and if the two-way valve 21A is closed and the two-way valve 21B is opened, then machine coolant flows in the machine coolant circuit 41B.

The switching damper 53 within the indoor unit 42 is set as shown in FIG. 29, so that the air suctioned in by the air in/out port 43A passes through the indoor cooling heat exchanger 6A and indoor air conditioning heat exchanger 7 and is blown from the air in/out port 43B. The air that was suctioned in by the air in/out port 43A is dehumidified and cooled by heat exchange in the indoor air conditioning heat exchanger 7. The temperature of the air passing through the heater 56 rises. The so-called reheat dehumidifying operation is in this way made possible. The relative humidity of the air supplied to inside the vehicle is in this way lowered so that the interior space becomes more comfortable. The air in/out port 43B connects to the inside (vehicle interior) by way of a duct not shown in the drawing, to regulate the inside temperature.

The air flow of the indoor fan 8A, the flow rate of the pump 5, the rotation speed of the compressor 1, the degree of opening of the expansion valve 22B, and the air flow of the outdoor fan 3 may be regulated in order to control the reheat quantity. To increase the reheat quantity, the air flow of the indoor fan 8A may be increased, the flow rate of the pump 5 may be increased, the rotation speed of the compressor 1 may be increased, the degree of opening of the expansion valve 22D may be widened, and the air flow of the outdoor fan 3 may be increased. On the other hand, if decreasing the reheat quantity, the air flow of the indoor fan 8A may be decreased, the flow rate of the pump 5 may be decreased, the rotation speed of the compressor 1 may be decreased, the degree of opening of the expansion valve 22B may be narrowed, and the air flow of the outdoor fan 3 may be decreased. Not all of the actuators need be controlled, and just controlling at least one actuator is sufficient.

(27) Machine Heating Operation

The heating element 9 must sometimes be pre-heated in situations such as engine starting in winter season with low outside air temperatures. Machine heating operation is an operation to warm the heating element 9 without utilizing the indoor air conditioning and the operation is described while referring to FIG. 30.

Figure 30:
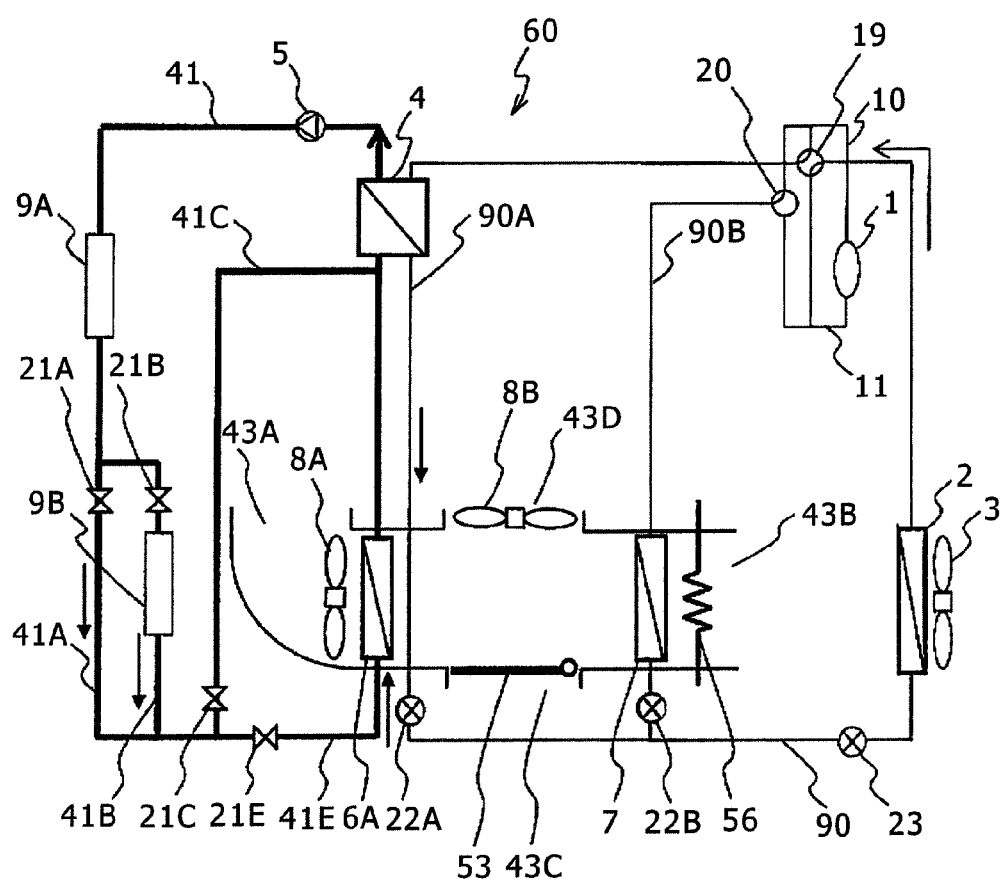
FIG. 30 is a drawing showing the overall structure of the air conditioner 60 of the second embodiment in the mode for the machine heating operation.

In the machine heating operation, the four-way valve 19 and the three-way valve 20 are connected as shown in FIG. 30, and the dispensing pipe 10 of the compressor 1 is connected to the intermediate heat exchanger 4 and the indoor air conditioning heat exchanger 7, and the intake pipe 11 of the compressor 1 is connected to the outdoor heat exchanger 2. Setting the expansion valve 22A to fully open, and the expansion valve 22B to fully closed prevents the air conditioning coolant from flowing into the indoor air conditioning heat exchanger 7. In other words, the intermediate heat exchanger 4 functions as a condenser and the outdoor heat exchanger 2 functions as an evaporator.

After the air conditioning coolant compressed by the compressor 1, is liquefied by the heat discharge from the intermediate heat exchanger 4, the air conditioning coolant passes through the fully opened expansion valve 22A and flows into the outdoor heat exchanger 2. The air conditioning coolant flowing into the outdoor heat exchanger 2 is depressurized by the expansion valve 23 and reaches a low temperature, low pressure state, and evaporates due to the absorption of heat from the outside air in the outdoor heat exchanger 2, and returns to the compressor 1. In the intermediate heat exchanger 4, heat exchange takes place between the machine coolant and the air conditioning coolant so that the machine coolant is heated.

The machine coolant circuit 41 closes the two-way valve 21E, and opens the two-way valve 21C to prevent machine coolant driven by the pump 5 from flowing into the indoor cooling heat exchanger 6A. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B. The two-way valve 21A or 21B is opened to allow the machine coolant to flow to the heating element 9 for heating. The refrigerating cycle circuit 90 heats the machine coolant so that the heating element 9 can be heated by circulating this machine coolant.

The indoor unit 42 does not suction in air or dispense air and does not drive the indoor fans 8A, 8B. Also, the indoor cooling heat exchanger 6A and the indoor air conditioning heat exchanger 7 do not respectively allow the machine coolant and the air conditioning coolant to flow so there is no heat exchange.

The flow rate of the pump 5, the rotation speed of the compressor 1, the degree of opening of the expansion valve 23, and the air flow of the outdoor fan 3 may be regulated in order to control the heating quantity. The flow rate of the pump 5 may be increased, the rotation speed of the compressor 1 may be increased, the degree of opening of the expansion valve 23 may be widened, and the air flow of the outdoor fan 3 may be increased in order to increase the heat quantity. On the other hand, the flow rate of the pump 5 may be decreased, the rotation speed of the compressor 1 may be decreased, the degree of opening of the expansion valve 23 may be narrowed, and the air flow of the outdoor fan 3 may be decreased in order to decrease the heat quantity. Not all of the actuators need be regulated, and regulating at least one of the actuators is sufficient.

The heating air conditioning operation shown in FIG. 27 and the machine heating operation shown in FIG. 30 make the forming of frost on the outdoor heat exchanger 2 unavoidable. Defrosting operation is an operation to temporarily switch from heating air conditioning operation and machine heating operation in order to remove frost on the outdoor heat exchanger 2 and is described while referring to FIG. 31.

(28) Defrosting Operation

Figure 31:
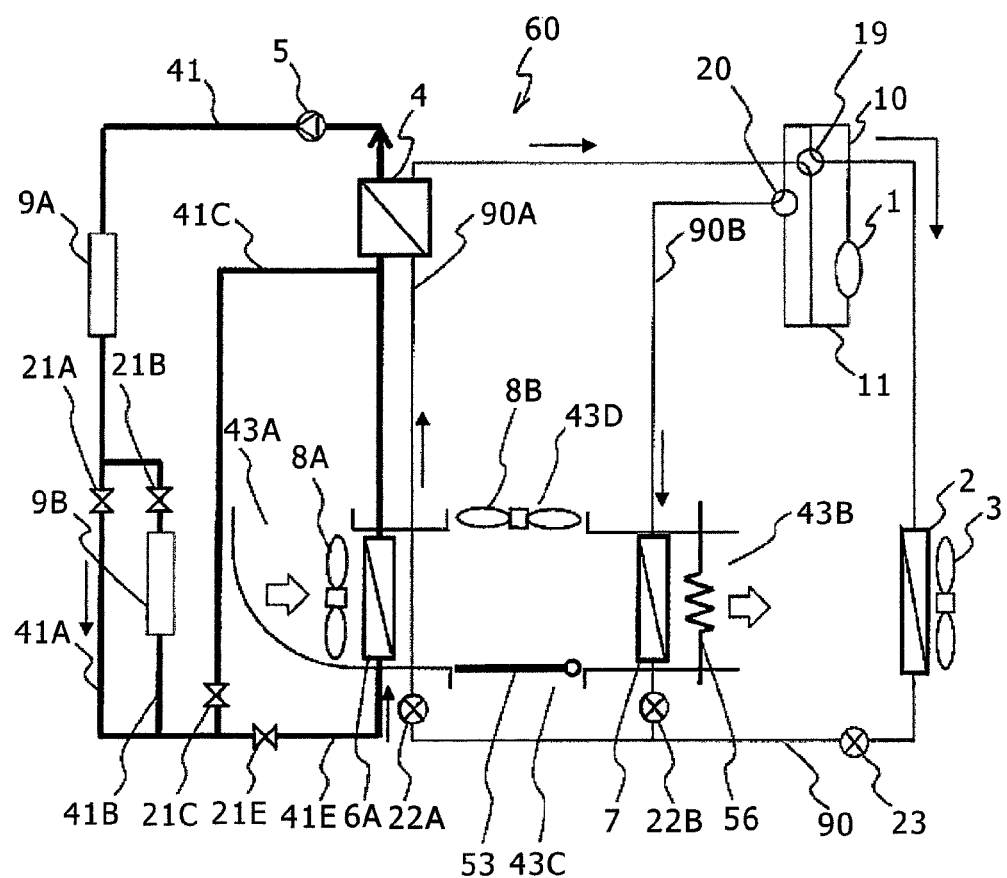
FIG. 31 is a drawing showing the overall structure of the air conditioner 60 of the second embodiment in the mode for the defrost operation.

In the defrosting operation, the four-way valve 19 and the three-way valve 20 are connected as shown in FIG. 31, and the dispensing pipe 10 of the compressor 1 is connected to the outdoor heat exchanger 2 and the indoor air conditioning heat exchanger 7; and the intake pipe 11 of the compressor 1 is connected to the intermediate heat exchanger 4. The expansion valves 23, 22B are set to fully open. In other words, the outdoor heat exchanger 2 and the indoor air conditioning heat exchanger 7 function as condensers and the intermediate heat exchanger 4 functions as an evaporator.

After the air conditioning coolant compressed by the compressor 1 is liquefied by the heat discharge from the outdoor heat exchanger 2 and the indoor air conditioning heat exchanger 7, the air conditioning coolant passes through the fully opened expansion valves 22B, 23 and flows into the intermediate heat exchanger 4. The frost attached to the outdoor heat exchanger 2 can in this way be removed. The air conditioning coolant flowing into the intermediate heat exchanger 4 is depressurized by the expansion valve 23 and reaches a low temperature, low pressure state, and evaporates due to absorption of heat in the intermediate heat exchanger 4, and returns to the compressor 1. In the intermediate heat exchanger 4, heat exchange takes place between the machine coolant and the air conditioning coolant so that the machine coolant is cooled.

The machine coolant circuit 41 closes the two-way valve 21E, and opens the two-way valve 21C to prevent the machine coolant driven by the pump 5 from flowing into the indoor cooling heat exchanger 6A. If the two-way valve 21A is opened and the two-way valve 21B is closed then machine coolant flows in the machine coolant circuit 41A; and if the two-way valve 21A is closed and the two-way valve 21B is opened, then the machine coolant flows in the machine coolant circuit 41B. The refrigerating cycle 90 cools the machine coolant so that the heating element 9 can be cooled by circulating this machine coolant.

The switching dampers 53 within the indoor unit 42 is set as shown in FIG. 31, so that the air suctioned in by the air in/out port 43A passes through the indoor cooling heat exchanger 6A, and the indoor air conditioning heat exchanger 7 and is blown from the air in/out port 43B. The machine coolant is not circulated within the indoor cooling heat exchanger 6A so that there are no fluctuations in the temperature of the air passing through the indoor cooling heat exchanger 6A.

The air suctioned in by the air in/out port 43A is heated by heat exchange in the indoor air conditioning heat exchanger 7 and is blown from the air in/out port 43B to inside the vehicle. Warm air can in this way be blown inside the vehicle even during defrosting operation. The air in/out port 43B connects to the inside of the vehicle (vehicle interior) by way of a duct not shown in the drawing and adjusts the temperature inside the vehicle.

The blowing of the heated air to inside the vehicle can also be prevented. In the above structure, fully closing the expansion valve 22B and not driving the indoor fan 8 will prevent air blow to inside the vehicle.

In order to regulate the amount of defrosting, the air flow of the indoor fan 8A, the flow rate of the pump 5, the rotation speed of the compressor 1, the degree of opening of the expansion valve 22A, and the air flow of the outdoor fan 3 may be controlled. To increase the amount of defrosting, the air flow of the indoor fan 8A may be increased, the flow rate of the pump 5 may be increased, the rotation speed of the compressor 1 may be increased, the degree of opening of the expansion valve 22A may be widened, and the air flow of the outdoor fan 3 may be increased. On the other hand, to lower the amount of defrosting, the air flow of the indoor fan 8A may be decreased, the flow rate of the pump 5 may be decreased, the rotation speed of the compressor 1 may be decreased, the degree of opening of the expansion valve 22A may be narrowed, and the air flow of the outdoor fan 3 may be decreased. Not all of the actuators need be regulated, and regulating at least one of the actuators is sufficient.

As shown in the above description, installing the heater 56 instead of the indoor cooling heat exchanger 8B eliminates the need for piping so that a smaller indoor unit 42 can be achieved.

The above described examples and embodiments may be employed separately or may be in combination. Single or combination usage is possible because the effect from the respective examples and embodiments can be rendered individually or synergistically. Moreover, the present invention is not limited to the above embodiments provided that there is no loss in the unique effect rendered by the invention.

LIST OF REFERENCE SIGNS

1: Compressor, 2: Outdoor heat exchanger, 3: Outdoor fan, 4: Intermediate heat exchanger, 5: Circulating pump, 6, 6A, 6B: Indoor cooling heat exchanger, 7: Indoor air conditioning heat exchanger, 8, 54: Indoor fan, 9, 9A, 9B, 9C, 9D: Heating element, 10: Dispensing pipe, 11: Intake pipe, 19: Four-way valve, 20: Three-way valve, 21A, 21B, 21C, 21D, 21E, 21F: Two-way valve, 22A, 22B, 23: Expansion valve, 41, 41A, 41B, 41C, 41D, 41E: Machine coolant circuit, 42: Indoor unit, 43A, 43B, 43C, 43D: Air in/out port, 51, 52, 53: Switching damper, 54: Indoor air intake port, 55: Outdoor air dispensing port, 56: Heater, 60: Air conditioner, 61: Air conditioning control device, 62: Vehicle indoor temperature, 63: Temperature for the machine requiring temperature regulation, 64: Vehicle operation information, 65: Drive schedule information, 70: Vehicular control device, 71: Drive control device, 72: Inverter, 73: Motor, 74: Brake, 75: Battery control device, 76: Battery, 90, 90A, 90B: Refrigeration cycle circuit.

The invention claimed is:

1. A vehicular air conditioning system for a vehicle, the system comprising:
    an outdoor air intake port located on the outside of the vehicle;
    an air dispensing port located inside of the vehicle;
    a first air flow path fluidically coupling the outdoor air intake port to the air dispensing port;
    a first indoor cooling heat exchanger located in the first air flow path;
    a second air flow path fluidically coupling the outdoor air intake port and the air dispensing port, wherein the second air flow path does not include the first indoor cooling heat exchanger;
    an indoor air conditioning heat exchanger located in the first air flow path and the second air flow path and located adjacent to the air dispensing port;
    a second indoor cooling heat exchanger located in the first air flow path and the second air flow path between the indoor air conditioning heat exchanger and the air dispensing port;
    a refrigeration cycle connected to the indoor air conditioning heat exchanger that includes a refrigerant coolant circuit;
    an intermediate heat exchanger connected to the coolant circuit;
    a machine coolant circuit that selectively transfers heat from a heat-generating device mounted in the vehicle to the first indoor cooling heat exchanger, the second indoor coolin heat exchanger, and the intermediate heat exchanger; and
    one or more switching dampers that selectively block the first air flow path and the second air flow path.

2. The vehicular air conditioning system according to claim 1, wherein the first air flow path can be switched to release air that passed through the first indoor cooling heat exchanger to outside the vehicle.

3. The vehicular air conditioning system according to claim 1, further comprising:
    a vehicle control device, wherein the vehicle control device:
    determines a state of the vehicle, and
    controls the one or more switching dampers based upon the state of the vehicle.

* * * * *